(12) United States Patent
Iwasaki et al.

(10) Patent No.: US 8,711,514 B2
(45) Date of Patent: Apr. 29, 2014

(54) MOTOR AND DISK DRIVE APPARATUS

(75) Inventors: Shuji Iwasaki, Kyoto (JP); Yoichi Sekii, Kyoto (JP); Takehito Tamaoka, Kyoto (JP); Hideki Nishimura, Kyoto (JP); Kazuto Miyajima, Kyoto (JP); Takuro Iguchi, Kyoto (JP); Kazuhiro Sato, Kyoto (JP); Takeyuki Shuto, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/613,109

(22) Filed: Sep. 13, 2012

(65) Prior Publication Data

US 2013/0242429 A1 Sep. 19, 2013

Related U.S. Application Data

(60) Provisional application No. 61/588,810, filed on Jan. 20, 2012.

(30) Foreign Application Priority Data

Sep. 30, 2011 (JP) .................................. 2011-218231
Jun. 7, 2012 (JP) .................................. 2012-129864

(51) Int. Cl.
*G11B 5/39* (2006.01)

(52) U.S. Cl.
USPC ...................................................... 360/99.08

(58) Field of Classification Search
CPC ........... G11B 19/2036; G11B 19/2018; G11B 19/2009
USPC ...................................................... 360/99.08
See application file for complete search history.

(56) References Cited

U.S. PATENT DOCUMENTS 5,533,811 A 7/1996 Polch et al.
5,558,443 A 9/1996 Zang (Continued)

FOREIGN PATENT DOCUMENTS

JP 06-028335 U 4/1994
JP 06-121484 A 4/1994

(Continued)

OTHER PUBLICATIONS

Kimura et al., "Dynamic Pressure Bearing and Spindle Motor Using the Same", U.S. Appl. No. 12/952,223, filed Nov. 23, 2010.

(Continued)

*Primary Examiner* — Mark Blouin
(74) *Attorney, Agent, or Firm* — Keating & Bennett, LLP

(57) ABSTRACT

A motor includes a shaft component including an inner shaft portion and an outer shaft portion. A radial gap is defined between a sleeve portion and the outer shaft portion. A radial dynamic pressure generating groove array is arranged on at least one surface of an inner circumferential surface of the sleeve portion and an outer circumferential surface of the outer shaft portion, which define the radial gap. The radial dynamic pressure generating groove array includes an upper and lower radial dynamic pressure generating groove array. The inner shaft portion is fixed to the outer shaft portion in an interference fit. An axial range of a fixing region of the inner shaft portion and the outer shaft portion which is in the interference fit is included in a range between the upper and lower radial dynamic pressure generating groove array.

32 Claims, 28 Drawing Sheets

(56) References Cited

U.S. PATENT DOCUMENTS

| | | | |
|---|---|---|---|
| 6,211,592 B1 | 4/2001 | Ichiyama | |
| 6,246,136 B1 | 6/2001 | Ichiyama | |
| 6,307,291 B1 | 10/2001 | Iwaki et al. | |
| 8,315,012 B2* | 11/2012 | Himeno et al. | 360/99.08 |
| 8,582,233 B2* | 11/2013 | Fukushima | 360/99.08 |
| 8,593,758 B2* | 11/2013 | Yamamoto et al. | 360/99.08 |
| 2004/0090702 A1 | 5/2004 | Aiello et al. | |
| 2004/0096131 A1 | 5/2004 | Aiello et al. | |
| 2004/0156568 A1 | 8/2004 | Woldemar et al. | |
| 2004/0165797 A1 | 8/2004 | Oku et al. | |
| 2004/0175062 A1 | 9/2004 | Nishimura et al. | |
| 2005/0031237 A1 | 2/2005 | Gomyo et al. | |
| 2005/0111769 A1 | 5/2005 | Haga | |
| 2005/0225187 A1 | 10/2005 | Hafen et al. | |
| 2006/0002638 A1 | 1/2006 | Ichiyama | |
| 2006/0002641 A1 | 1/2006 | Ichiyama | |
| 2006/0039634 A1 | 2/2006 | Ichiyama | |
| 2006/0039636 A1 | 2/2006 | Ichiyama | |
| 2006/0051001 A1 | 3/2006 | Nishimura et al. | |
| 2006/0210205 A1 | 9/2006 | Engesser et al. | |
| 2006/0222276 A1 | 10/2006 | Uenosono | |
| 2007/0140606 A1 | 6/2007 | Feng et al. | |
| 2007/0154123 A1 | 7/2007 | Gomyo et al. | |
| 2007/0177832 A1 | 8/2007 | Gotoh et al. | |
| 2007/0211971 A1 | 9/2007 | Obara et al. | |
| 2007/0230841 A1 | 10/2007 | Yano et al. | |
| 2008/0006332 A1 | 1/2008 | Ishizawa et al. | |
| 2008/0056104 A1 | 3/2008 | Nishimura et al. | |
| 2009/0129710 A1 | 5/2009 | Ito et al. | |
| 2009/0140587 A1 | 6/2009 | Popov et al. | |
| 2009/0140588 A1 | 6/2009 | Drautz et al. | |
| 2009/0279818 A1 | 11/2009 | Le et al. | |
| 2010/0124387 A1 | 5/2010 | Fuss et al. | |

FOREIGN PATENT DOCUMENTS

| | | | |
|---|---|---|---|
| JP | 07-336924 A | 12/1995 | |
| JP | 2000-186716 A | 7/2000 | |
| JP | 2002-005171 A | 1/2002 | |
| JP | 2003-092867 A | 3/2003 | |
| JP | 2003-244886 A | 8/2003 | |
| JP | 2004-173377 A | 6/2004 | |
| JP | 2005-048890 A | 2/2005 | |
| JP | 2006-226388 A | 8/2006 | |
| JP | 2007-270855 A | 10/2007 | |
| JP | 2009-041671 A | 2/2009 | |
| JP | 2009-133361 A | 6/2009 | |
| JP | 2011-002024 A | 1/2011 | |
| WO | 2006/120719 A1 | 11/2006 | |

OTHER PUBLICATIONS

Kimura et al., "Bearing Apparatus, Spindle Motor, and Disk Drive Apparatus", U.S. Appl. No. 12/791,147, filed Jun. 1, 2010.
Oe et al., "Bearing Apparatus, Spindle Motor and Disk Drive Apparatus", U.S. Appl. No. 12/793,851, filed Jun. 4, 2010.
Yamada et al., "Fluid Dynamic Bearing Apparatus, Spindle Motor, and Disk Drive Apparatus", U.S. Appl. No. 12/742,931, filed May 14, 2010.
Yamada et al., "Fluid Dynamic Bearing Apparatus, Spindle Motor, and Disk Drive Apparatus", U.S. Appl. No. 12/899,658, filed Oct. 7, 2010.
Yamada et al., "Fluid Dynamic Bearing Apparatus, Spindle Motor, and Disk Drive Apparatus", U.S. Appl. No. 13/299,542, filed Nov. 18, 2011.
Kimura et al., "Bearing Apparatus, Spindle Motor, and Disk Drive Apparatus", U.S. Appl. No. 13/602,420, filed Sep. 4, 2012.
Kimura et al., "Bearing Apparatus, Spindle Motor, and Disk Drive Apparatus", U.S. Appl. No. 13/681,500, filed Nov. 20, 2012.
Kimura et al., "Bearing Apparatus, Spindle Motor, and Disk Drive Apparatus", U.S. Appl. No. 13/602,348, filed Sep. 4, 2012.
Fukushima, "Motor and Disk Drive Apparatus," U.S. Appl. No. 13/751,380, filed Jan. 28, 2013.
Tamaoka et al., "Motor and Disk Drive Apparatus", U.S. Appl. No. 13/613,106, filed Sep. 13, 2012.
Iwasaki et al., "Motor and Disk Drive Apparatus", U.S. Appl. No. 13/613,108, filed Sep. 13, 2012.
Sekii et al., "Spindle Motor and Disk Drive Apparatus", U.S. Appl. No. 13/767,205, filed Feb. 14, 2013.
Sekii et al., "Bearing Apparatus, Spindle Motor, and Disk Drive Apparatus", U.S. Appl. No. 13/789,796, filed Mar. 8, 2013.
Sekii et al., "Bearing Apparatus, Spindle Motor, and Disk Drive Apparatus", U.S. Appl. No. 13/790,089, filed Mar. 8, 2013.
Sato et al., "Spindle Motor and Disk Drive Apparatus", U.S. Appl. No. 13/798,857, filed Mar. 13, 2013.
Sekii, "Motor and Disk Drive Apparatus", U.S. Appl. No. 13/886,290, filed May 3, 2013.
Watanabe et al., "Spindle Motor and Disk Drive Apparatus", U.S. Appl. No. 13/898,921, filed May 21, 2013.
Kimura et al., "Bearing Mechanism, Motor, and Disk Drive Apparatus", U.S. Appl. No. 13/775,475, filed Feb. 25, 2013.
Sumiji et al., "Bearing Mechanism, Motor, and Disk Drive Apparatus", U.S. Appl. No. 13/775,467, filed Feb. 25, 2013.
Sumiji et al., "Bearing Mechanism, Motor, and Disk Drive Apparatus", U.S. Appl. No. 13/785,297, filed Mar. 5, 2013.
English translation of Official Communication issued in International Patent Application No. PCT/JP2009/059556, mailed on Jan. 20, 2011.

* cited by examiner

MOTOR AND DISK DRIVE APPARATUS

BACKGROUND OF THE INVENTION

1. Field of the Invention

The present invention relates to an electrically powered motor.

2. Description of the Related Art

In the past, as a motor of a disk drive apparatus, there has been a motor including a bearing mechanism using fluid dynamic pressure. A conventional spindle motor disclosed in Japanese Patent Application Publication No. 2009-136143 includes a shaft, a first bearing component, a second bearing component, and a rotor component. The first bearing component is formed in a cup shape and a lower portion of the shaft is attached in a central opening of the first bearing component. The second bearing component is of an annular shape and is formed integrally with the shaft at an upper end portion of the shaft. The rotor component is disposed in an intermediate space defined by the shaft, the first bearing component, and the second bearing component. A fluid dynamic pressure radial bearing portion is formed between a cylindrical surface of the rotor component and an outer circumferential surface of the shaft.

A fluid dynamic pressure thrust bearing portion is formed between a lower surface of the rotor component and a surface of the first bearing component which axially faces the lower surface. A seal gap extending upward is defined in an outer side of the fluid dynamic pressure thrust bearing portion. A pumping seal portion is formed between a lower surface of the second bearing component and a surface of the rotor component which axially faces the lower surface. Another seal gap extending upward is defined in an outer side of the pumping seal portion.

In the conventional spindle motor shown in Japanese Patent Application Publication No. 2009-136143, since an upper seal gap extends farther upward than a radial gap, an entirety of the motor undesirably becomes taller by an amount corresponding to an axial length of the seal gap.

SUMMARY OF THE INVENTION

A motor according to a preferred embodiment of the present invention includes a rotating portion including a rotor magnet, and a stationary portion including a stator facing the rotor magnet.

The stationary portion preferably includes a shaft component, an upper plate portion, and a lower plate portion. The shaft component includes an inner shaft portion arranged around a central axis and an outer shaft portion fixed to an outer circumferential surface of the inner shaft portion. The upper plate portion is preferably a single monolithic member together with one of the inner shaft portion and the outer shaft portion. The upper plate portion extends radially outward from an upper portion of the one of the inner shaft portion and the outer shaft portion. The lower plate portion is preferably a single monolithic member together with the other of the inner shaft portion and the outer shaft portion. The lower plate portion extends radially outward from a lower portion of the other of the inner shaft portion and the outer shaft portion.

The rotating portion preferably includes a sleeve portion disposed between the upper plate portion and the lower plate portion.

A lubricating oil is preferably continuously provided between an upper thrust gap between the sleeve portion and the upper plate portion, a radial gap between the sleeve portion and the outer shaft portion, and a lower thrust gap between the sleeve portion and the lower plate portion.

An upper seal portion is preferably arranged to extend radially outward from the radial gap and between the stationary portion and the rotating portion. An upper surface of the lubricating oil is preferably located in the upper seal portion. A lower seal portion is preferably arranged to extend radially outward from the radial gap and between the stationary portion and the rotating portion. A lower surface of the lubricating oil is located in the lower seal portion.

A lower thrust dynamic pressure generating groove array is preferably defined on at least one surface of the lower surface of the sleeve portion and the upper surface of the lower plate portion, which define the lower thrust gap. A radial dynamic pressure generating groove array is preferably defined on at least one surface of an inner circumferential surface of the sleeve portion and an outer circumferential surface of the outer shaft portion, which define the radial gap.

The radial dynamic pressure generating groove array preferably includes an upper radial dynamic pressure generating groove array and a lower radial dynamic pressure generating groove array.

The inner shaft portion preferably is fixed to the outer shaft portion in, for example, an interference fit.

An axial range of a fixing region of the inner shaft portion and the outer shaft portion which is in the interference fit is preferably included in a range between the upper radial dynamic pressure generating groove array and the lower radial dynamic pressure generating groove array.

A motor according to another preferred embodiment of the present invention includes a rotating portion including a rotor magnet, and a stationary portion including a stator facing the rotor magnet.

The stationary portion preferably includes a shaft component, an upper plate portion, and a lower plate portion. The shaft component preferably includes an inner shaft portion arranged around a central axis, and an outer shaft portion fixed to an outer circumferential surface of the inner shaft portion. The upper plate portion preferably defines a single monolithic member together with one of the inner shaft portion and the outer shaft portion. The upper plate portion extends radially outward from an upper portion of the one of the inner shaft portion and the outer shaft portion. The lower plate portion preferably defines a single monolithic member together with the other of the inner shaft portion and the outer shaft portion. The lower plate portion extends radially outward from a lower portion of the other of the inner shaft portion and the outer shaft portion.

The rotating portion preferably includes a sleeve portion disposed between the upper plate portion and the lower plate portion.

A lubricating oil is preferably continuously provided between an upper thrust gap between the sleeve portion and the upper plate portion, a radial gap between the sleeve portion and the outer shaft portion, and a lower thrust gap between the sleeve portion and the lower plate portion.

An upper seal portion is arranged to extend radially outward from the radial gap and between the stationary portion and the rotating portion. An upper surface of the lubricating oil is preferably located in the upper seal portion. A lower seal portion is arranged to extend radially outward from the radial gap between the stationary portion and the rotating portion. A lower surface of the lubricating oil is preferably located in the lower seal portion.

A lower thrust dynamic pressure generating groove array is preferably arranged on at least one surface of a lower surface of the sleeve portion and an upper surface of the lower plate portion, which define the lower thrust gap. A radial dynamic pressure generating groove array is preferably arranged on at least one surface of an inner circumferential surface of the sleeve portion and an outer circumferential surface of the outer shaft portion, which define the radial gap.

An adhesive retaining portion is preferably provided between an outer peripheral portion of the inner shaft portion and an inner peripheral portion of the outer shaft portion.

The radial dynamic pressure generating groove array preferably includes an upper radial dynamic pressure generating groove array and a lower radial dynamic pressure generating groove array.

An existing range in an axial direction of the adhesive retaining portion is preferably included in a range between the upper radial dynamic pressure generating groove array and the lower radial dynamic pressure generating groove array.

A motor according to still another exemplary preferred embodiment of the present invention includes a rotating portion including a rotor magnet, and a stationary portion including a stator which facing the rotor magnet.

The stationary portion preferably includes a shaft component, an upper plate portion, and a lower plate portion. The shaft component preferably includes an inner shaft portion arranged around a central axis, and an outer shaft portion fixed to an outer circumferential surface of the inner shaft portion. The upper plate portion preferably defines a single monolithic member together with one of the inner shaft portion and the outer shaft portion. The upper plate portion extends radially outward from an upper portion of the one of the inner shaft portion and the outer shaft portion. The lower plate portion preferably defines a single monolithic member together with the other of the inner shaft portion and the outer shaft portion. The lower plate portion extends radially outward from a lower portion of the other of the inner shaft portion and the outer shaft portion.

The rotating portion preferably includes a sleeve portion disposed between the upper plate portion and the lower plate portion.

A lubricating oil is preferably continuously provided between an upper thrust gap between the sleeve portion and the upper plate portion, a radial gap between the sleeve portion and the outer shaft portion, and a lower thrust gap between the sleeve portion and the lower plate portion.

An upper seal portion is preferably arranged radially outward from the radial gap and between the stationary portion and the rotating portion. An upper surface of the lubricating oil is preferably located in the upper seal portion. A lower seal portion is arranged to extend radially outward from the radial gap and between the stationary portion and the rotating portion. A lower surface of the lubricating oil is preferably located in the lower seal portion.

A lower thrust dynamic pressure generating groove array is preferably arranged on at least one surface of a lower surface of the sleeve portion and the upper surface of the lower plate portion, which define the lower thrust gap. A radial dynamic pressure generating groove array is preferably arranged on at least one surface of an inner circumferential surface of the sleeve portion and an outer circumferential surface of the outer shaft portion, which define the radial gap.

An axial position of a lower end of the inner shaft portion and an axial position of a lower end of the upper plate cylindrical portion preferably conform to each other. Or, the lower end of the inner shaft portion is arranged above the axial position of the lower end of the upper plate cylindrical portion.

According to the preferred embodiments of the present invention, it becomes possible to make a motor slimmer and also preferably obtain an axial length of an existence range of a radial gap and an axial length of a fixing range of a shaft component.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
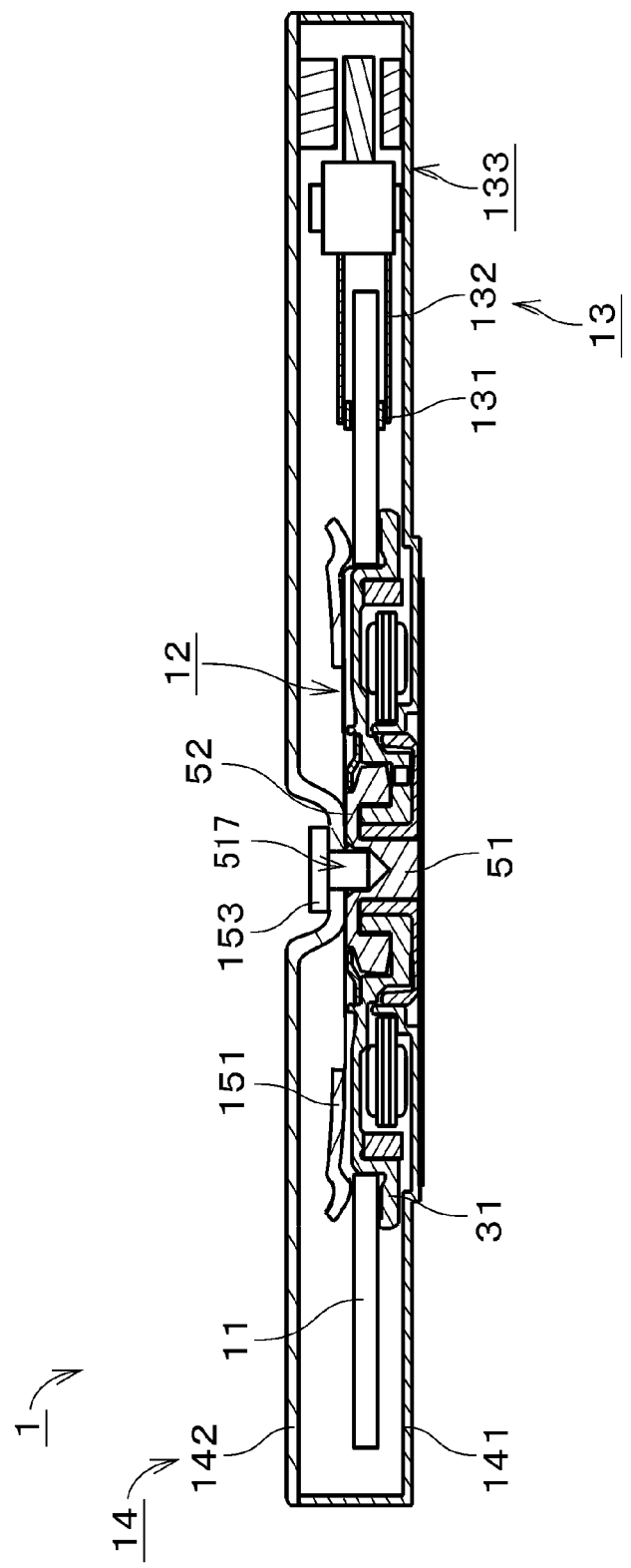
FIG. 1 is a cross-sectional view of a disk drive apparatus according to a first preferred embodiment of the present invention.

In this specification, an upper side and a lower side of FIG. 1 in a direction of a central axis of a motor are simply referred to as an "upper side" and a "lower side", respectively. In addition, the terms "vertical direction", "upper side", "lower side", and the likes used herein are not meant to indicate relative positions or directions when actually installed in a device. Further, a direction parallel or substantially parallel to the central axis is referred to by the term "axial direction", "axial", or "axially", a radial direction radiating from the central axis is simply referred to by the term "radial direction", "radial", or "radially", and a circumferential direction about the central axis is simply referred to by the term "circumferential direction", "circumferential", or "circumferentially".

FIG. 1 is a vertical cross-sectional view of a disk drive apparatus 1 including a spindle motor (hereinafter simply referred to as a "motor") according to a first exemplary preferred embodiment of the present invention. The disk drive apparatus 1 is a so-called hard disk drive apparatus. The disk drive apparatus 1 preferably includes a disk 11, a motor 12, an access portion 13, and a housing 14. The motor 12 rotates the disk 11, on which information is recorded. The access portion 13 performs at least one of reading and writing of information from or to the disk 11.

The housing 14 preferably includes a first housing member 141 of a cup-shape and a second housing member 142 of a plate shape. The disk 11, the motor 12, and the access portion 13 are preferably accommodated inside the first housing member 141. The second housing member 142 is fitted to the first housing member 141, whereby the housing 14 is defined. An interior space of the disk drive apparatus 1 is preferably a clean space having no or only an extremely low presence of dust or dirt. In this preferred embodiment, air is present inside the disk drive apparatus 1. In addition, the interior space of the disk drive apparatus 1 may alternatively be filled with, for example, helium gas or hydrogen gas and may also be filled with mixed gas of these gases and air.

The disk 11 is clamped to the motor 12 by a clamper 151. The access portion 13 preferably includes a head 131, an arm 132, and a head moving mechanism 133. The head 131 approaches the disk 11, thereby magnetically performing at least one of reading and writing of information. The arm 132 supports the head 131. The head moving mechanism 133 moves the arm 132, thereby moving the head 131 relatively with respect to the disk 11. The above mechanism enables the head 131 make access to a desired position of the disk 11 with the head 131 being in close proximity to the disk 11 which rotates. In addition, the number of heads 131 is preferably two, for example. Two heads are respectively disposed above and below the disk 11. In addition, the head 131 may also perform both the reading and the writing of information by approaching the disk 11.

Figure 2:
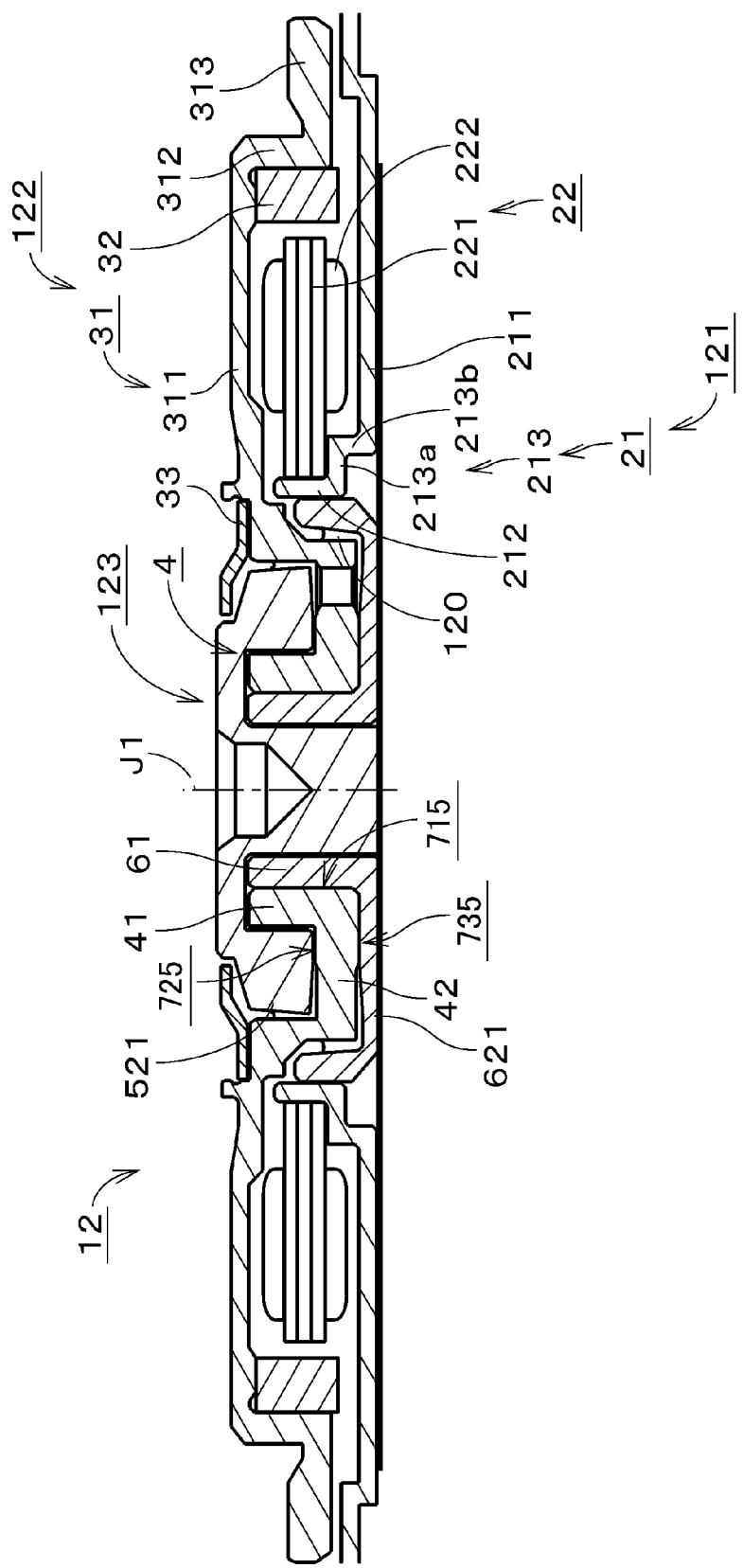
FIG. 2 is a cross-sectional view of a motor according to a preferred embodiment of the present invention.

FIG. 2 is a vertical cross-sectional view of the motor 12. The motor 12 is preferably an outer rotor type motor. The motor 12 includes a stationary portion 121, a rotating portion 122, and a bearing mechanism 123. The rotating portion 122 is preferably supported with lubricating oil 120 so as to be able to rotate with respect to the stationary portion 121 around a central axis J1 of the motor 12.

The stationary portion 121 preferably includes a base plate 21, which is a base portion, and a stator 22. The base plate 21 is preferably defined as a single monolithic member with the first housing member 141 in FIG. 1 and defines a portion of the housing 14. The base plate 21 is preferably shaped through, for example, press working. The base plate 21 preferably includes a bottom portion 211, a stator fixing portion 212, and a step portion 213. The stator fixing portion 212 is of a substantially cylindrical shape and faces upward from an inner edge portion of the bottom portion 211. The step portion 213 protrudes radially outward from a lower portion of the stator fixing portion 212, between the stator fixing portion 212 and the bottom portion 211. The step portion 213 includes a step upper portion 213a extending radially outward from the lower portion of the stator fixing portion 212 and a step lower portion 213b facing downward from an outer edge of the step upper portion 213a. The bearing mechanism 123 is disposed inside the stator fixing portion 212. The stator 22 preferably includes a stator core 221 and a coil 222. A conducting wire is wound on the stator core 221 to thereby define the coil 222. A radially inner region of the stator core 221 is fixed to an outer circumferential surface of the stator fixing portion 212. Further, a lower surface of the region axially comes into contact with an upper surface of the step upper portion 213a. The stator 22 is preferably, for example, adhered to the stator fixing portion 212 with an adhesive with a gap being interposed between the stator 22 and the outer circumferential surface of the stator fixing portion 212.

The rotating portion 122 preferably includes a rotor hub 31, which is a hub portion, a rotor magnet 32, and a seal cap 33. The rotor hub 31 is preferably a single monolithic member. The rotor hub 31 is preferably formed by, for example, shaping a slug into an appropriate shape through a forging process and then shaping it into a final shape through cutting work. The rotor hub 31 preferably includes a sleeve portion 4, a cover portion 311, a hub cylindrical portion 312, and a disk placing portion 313. The seal cap 33 is disposed on the upper side of the sleeve portion 4. The sleeve portion 4 defines a portion of the bearing mechanism 123. The cover portion 311 extends radially outward from the sleeve portion 4. The hub cylindrical portion 312 extends downward from an outer edge portion of the cover portion 311. The rotor magnet 32 is fixed to an inner side of the hub cylindrical portion 312. The disk placing portion 313 preferably protrudes radially outward from an outer circumferential surface of the hub cylindrical portion 312 and the disk 11 shown in FIG. 1 is disposed on the disk placing portion 313. The rotor magnet 32 radially faces the stator 22. Torque is generated between the stator 22 and the rotor magnet 32.

Figure 3:
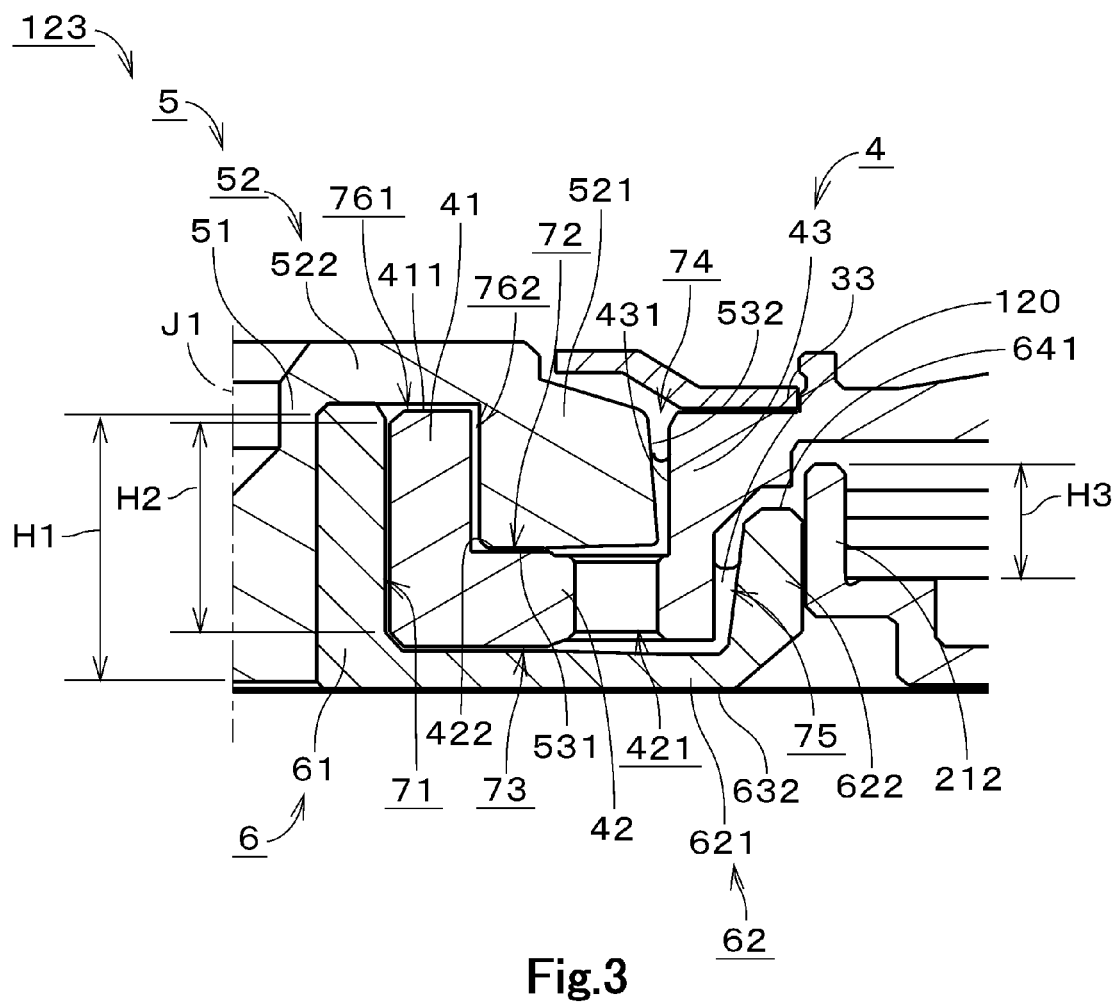
FIG. 3 is a cross-sectional view of the motor according to a preferred embodiment of the present invention.

FIG. 3 is an enlarged view showing the bearing mechanism 123. The bearing mechanism 123 preferably includes the sleeve portion 4, an upper cup member 5, a lower cup member 6, and the lubricating oil 120. The upper cup member 5 and the lower cup member 6 define a portion of the stationary portion 121. The sleeve portion 4 is disposed between the upper cup member 5 and the lower cup member 6. The sleeve portion 4 preferably includes an inner sleeve cylindrical portion 41, a sleeve flange portion 42, and an outer sleeve cylindrical portion 43. The inner sleeve cylindrical portion 41 preferably has a cylindrical shape centered on the central axis J1. The sleeve flange portion 42 extends radially outward from a lower portion of the inner sleeve cylindrical portion 41. The sleeve flange portion 42 preferably includes a communicating hole 421 penetrating through the sleeve flange portion 42 in the vertical direction. In this preferred embodiment, the number of communicating holes 421 is preferably one. However, two or more communicating holes 421 may be provided if so desired. Further, the communicating hole 421 may alternatively not be provided at all. The same also applies to the following preferred embodiments.

The outer sleeve cylindrical portion 43 extends upward from an outer edge portion of the sleeve flange portion 42. The height of an upper surface of the outer sleeve cylindrical portion 43 is almost the same as the height of an upper surface 411 of the inner sleeve cylindrical portion 41. Hereinafter, a portion which is a lower portion of the inner sleeve cylindrical portion 41 as well as an inner peripheral portion of the sleeve flange portion 42 will be described as a portion of the inner sleeve cylindrical portion 41. Further, a portion which is a lower portion of the outer sleeve cylindrical portion 43 as well as an outer peripheral portion of the sleeve flange portion 42 will be described as a portion of the outer sleeve cylindrical portion 43. In the sleeve portion 4, the radial width between an outer circumferential surface of the inner sleeve cylindrical portion 41 and an inner circumferential surface 431 of the outer sleeve cylindrical portion 43 is preferably greater than the radial thickness of the inner sleeve cylindrical portion 41.

The upper cup member 5 preferably includes an inner shaft portion 51 and an upper plate portion 52. The inner shaft portion 51 and the upper plate portion 52 are preferably formed as a single monolithic member through, for example, cutting work. In addition, the upper cup member 5 may also preferably be shaped through, for example, a forging process or press working. The inner shaft portion 51 is centered on the central axis J1. The upper plate portion 52 is preferably of a cup shape facing downward and extends radially outward from an upper portion of the inner shaft portion 51. The upper plate portion 52 preferably includes an upper plate cylindrical portion 521 and an upper plate connecting portion 522. The upper plate cylindrical portion 521 extends downward at an outer edge of the upper plate portion 52. The upper plate cylindrical portion 521 is preferably arranged farther outward than the inner sleeve cylindrical portion 41 and inner than the outer sleeve cylindrical portion 43. A lower surface 531 of the upper plate cylindrical portion 521 axially faces an upper surface 422 of the sleeve flange portion 42. An outer circumferential surface 532 of the upper plate cylindrical portion 521 preferably inclines radially inward as it extends upward. The upper plate connecting portion 522 connects an upper portion of the inner shaft portion 51 and an upper portion of the upper plate cylindrical portion 521. In the upper cup member 5, the radial width of a lower surface of the upper plate connecting portion 522 is greater than the axial distance between the lower surface 531 of the upper plate cylindrical portion 521 and the lower surface of the upper plate connecting portion 522.

As shown in FIG. 1, the clamper 151 is fixed to the rotor hub 31. The disk 11 is supported by the clamper 151 and the rotor hub 31. A screw 153 is preferably screwed into a screw hole 517 of the inner shaft portion 51 through a through-hole of the center of the second housing member 142.

The lower cup member 6 preferably includes an outer shaft portion 61 and a lower plate portion 62. The outer shaft portion 61 and the lower plate portion 62 preferably a single monolithic member. The outer shaft portion 61 is of a substantially cylindrical shape centered on the central axis J1. The lower plate portion 62 is of a cup shape facing upward and extends radially outward from a lower portion of the outer shaft portion 61. In the motor 12, the sleeve portion 4 is disposed between the lower plate portion 62 and the upper plate portion 52. The outer shaft portion 61 is inserted into the inner sleeve cylindrical portion 41. Further, the outer shaft portion 61 is fitted to the inner shaft portion 51 through insertion as an example of a clearance fit. The outer shaft portion 61 is preferably, for example, adhered and fixed over the entire length to an outer circumferential surface of the inner shaft portion 51. In this manner, a shaft component which is the shaft portion of the bearing mechanism 123 includes the inner shaft portion 51 and the outer shaft portion 61.

The lower plate portion 62 preferably includes a lower plate connecting portion 621 and a lower plate cylindrical portion 622. The lower plate cylindrical portion 622 extends upward at an outer edge of the lower plate portion 62. The lower plate cylindrical portion 622 is arranged farther radially outward than the outer sleeve cylindrical portion 43. The lower plate connecting portion 621 extends radially inward from a lower portion of the lower plate cylindrical portion 622 and connects the lower plate cylindrical portion 622 and a lower portion of the outer shaft portion 61 in a region below the sleeve flange portion 42. The axial thickness of the lower plate connecting portion 621 is thinner than the radial thickness of the outer shaft portion and the radial thickness of the lower plate cylindrical portion 622. A lower surface 632 of the lower plate connecting portion 621 and the lower surface of the outer shaft portion 61 are preferably arranged lower than a lower end of the inner shaft portion 51 in the axial direction. In this way, when adhering and fixing the inner shaft portion 51 and the outer shaft portion 61 to each other, excess adhesive can preferably be prevented from running off below the lower surface 632 of the lower plate connecting portion 621. An upper end 641 of the lower plate cylindrical portion 622 is arranged higher than the lower surface 531 of the upper plate cylindrical portion 521 in the axial direction.

Figure 4:
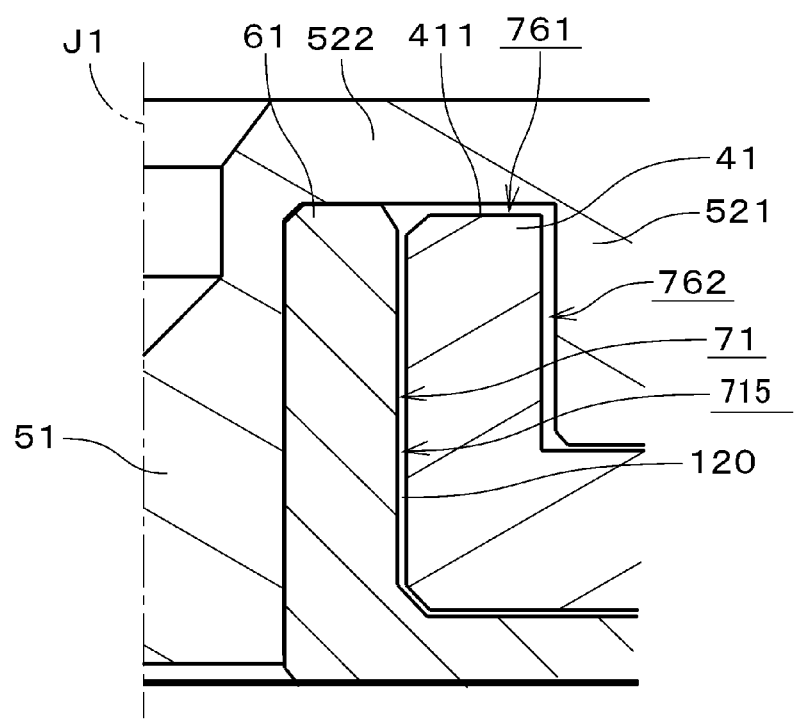
FIG. 4 is an enlarged cross-sectional view showing a portion of a bearing mechanism according to a preferred embodiment of the present invention.

FIG. 4 is an enlarged view showing the vicinity of the outer shaft portion 61 of the bearing mechanism 123. The upper plate connecting portion 522 is arranged above the outer shaft portion 61 and the inner sleeve cylindrical portion 41 and an upper end of the outer shaft portion 61 axially comes into contact with the lower surface of the upper plate connecting portion 522. A minute gap 761, which extends in the radial direction, is preferably defined between the upper surface 411 of the inner sleeve cylindrical portion 41 and the lower surface of the upper plate connecting portion 522. A gap 762 of a cylindrical shape centered on the central axis J1 is defined between the outer circumferential surface of the inner sleeve cylindrical portion 41 and an inner circumferential surface of the upper plate cylindrical portion 521. A radial gap 71 is preferably defined between an outer circumferential surface of the outer shaft portion 61 and an inner circumferential surface of the inner sleeve cylindrical portion 41.

In the motor 12, as shown in FIG. 3, the axial length of a fixing range H1 in which the outer shaft portion and the inner shaft portion 51 radially overlap is preferably longer than the length of an existing range H2 in the axial direction of the radial gap 71. Further, the fixing range H1 radially overlaps with the entirety of the existing range H2 of the radial gap 71. The axial length of the fixing range H1 is longer than the axial lengths of the axially longest regions of the sleeve portion 4, that is, the inner sleeve cylindrical portion 41 and the outer sleeve cylindrical portion 43. By making the fixing range H1 longer than the sleeve portion 4 which defines a portion of the rotating portion 122, it is possible to improve the rigidity of the motor 12. The existing range H2 of the radial gap 71 radially overlaps with the entirety of an existing range H3 in the axial direction of the stator fixing portion 212.

Figure 5:
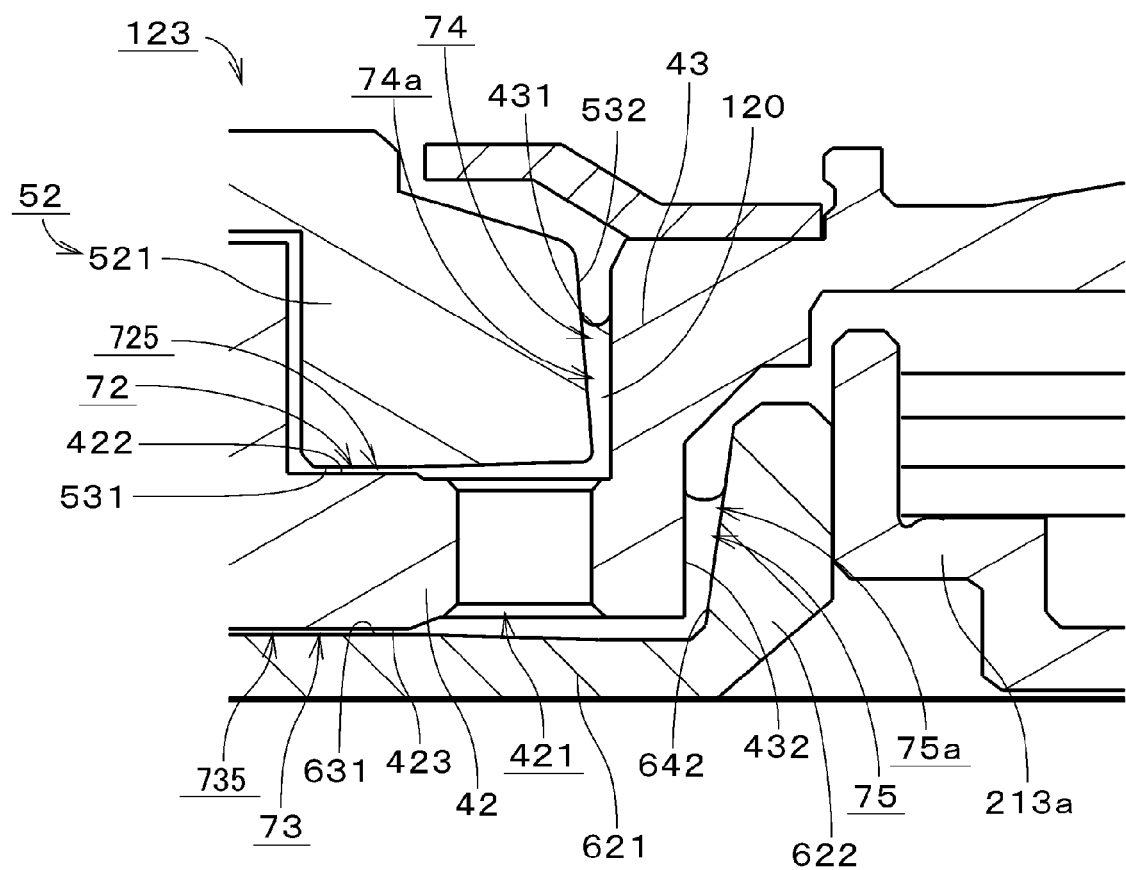
FIG. 5 is a cross-sectional view of the bearing mechanism according to a preferred embodiment of the present invention.

FIG. 5 is an enlarged view showing the vicinity of the sleeve flange portion 42 of the bearing mechanism 123. A gap 72 is defined between an area arranged farther inward radially than the communicating hole 421 of the upper surface 422 of the sleeve flange portion 42 and the lower surface 531 of the upper plate cylindrical portion 521. The gap 72 will be hereinafter referred to as an "upper thrust gap 72". The upper thrust gap 72 is connected to an upper portion of the radial gap 71 through the gap 762 and the gap 761 shown in FIG. 3. The gap 762 is preferably arranged between the outer circumferential surface of the inner sleeve cylindrical portion 41 and the inner circumferential surface of the upper plate cylindrical portion 521. The gap 761 is preferably arranged between the upper surface 411 of the inner sleeve cylindrical portion 41 and the lower surface of the upper plate connecting portion 522. The gap 761 will be hereinafter referred to as a "lateral connection gap 761". The gap 762 will be referred to as a "vertical connection gap 762".

A gap 73 is preferably defined between an area arranged farther inward radially than the communicating hole 421 of a lower surface 423 of the sleeve flange portion 42 (shown in FIG. 5) and an upper surface 631 of the lower plate connecting portion 621. The gap 73 will be hereinafter referred to as a "lower thrust gap 73". The upper thrust gap 72 and the lower thrust gap 73 communicate with each other by the communicating hole 421.

A gap 74 which is open upward is preferably defined between the outer circumferential surface 532 of the upper plate cylindrical portion 521 and the inner circumferential surface 431 of the outer sleeve cylindrical portion 43. The gap 74 will be hereinafter referred to as an "upper seal gap 74". The radial width of the upper seal gap 74 preferably gradually increases as it extends upward. An axial length H4 of the upper seal gap 74 (shown in FIG. 6) is preferably greater than the thickness of the sleeve flange portion 42. The height of an opening 740 of the upper seal gap 74 is preferably the same or almost the same as the height of the upper surface 411 of the inner sleeve cylindrical portion 41. In addition, the upper surface 411 of the inner sleeve cylindrical portion 41 may alternatively also be arranged higher than the opening 740 of the upper seal gap 74.

In the upper seal gap 74, an upper seal portion 74a which retains the lubricating oil 120 by capillary action is defined. The surface of the lubricating oil 120 is located in the upper seal portion 74a. The upper seal portion 74a is arranged farther outward radially than the radial gap 71. The opening 740 of the upper seal gap 74 is preferably covered by the seal cap 33.

As shown in FIG. 5, an inner circumferential surface 642 of the lower plate cylindrical portion 622 inclines radially outward as it extends upward. A gap 75 which is open upward is defined between the inner circumferential surface 642 and a lower portion 432 of the outer circumferential surface of the outer sleeve cylindrical portion 43. The gap 75 will be hereinafter referred to as a "lower seal gap 75". The radial width of the lower seal gap 75 gradually increases as it extends upward. The lower seal gap 75 preferably radially overlaps with the upper surface of the step upper portion 213a. In the lower seal gap 75, a lower seal portion 75a which retains the lubricating oil 120 by capillary action is defined. The surface of the lubricating oil 120 is located in the lower seal portion 75a. The lower seal portion 75a is arranged farther outward radially than the upper seal portion 74a and the radial gap 71 in FIG. 4. The lower seal portion 75a is preferably connected to the upper seal portion 74a through the communicating hole 421. In this way, it is possible to reduce generation of a pressure difference between the upper and lower seal portions 74a and 75a.

Figure 6:
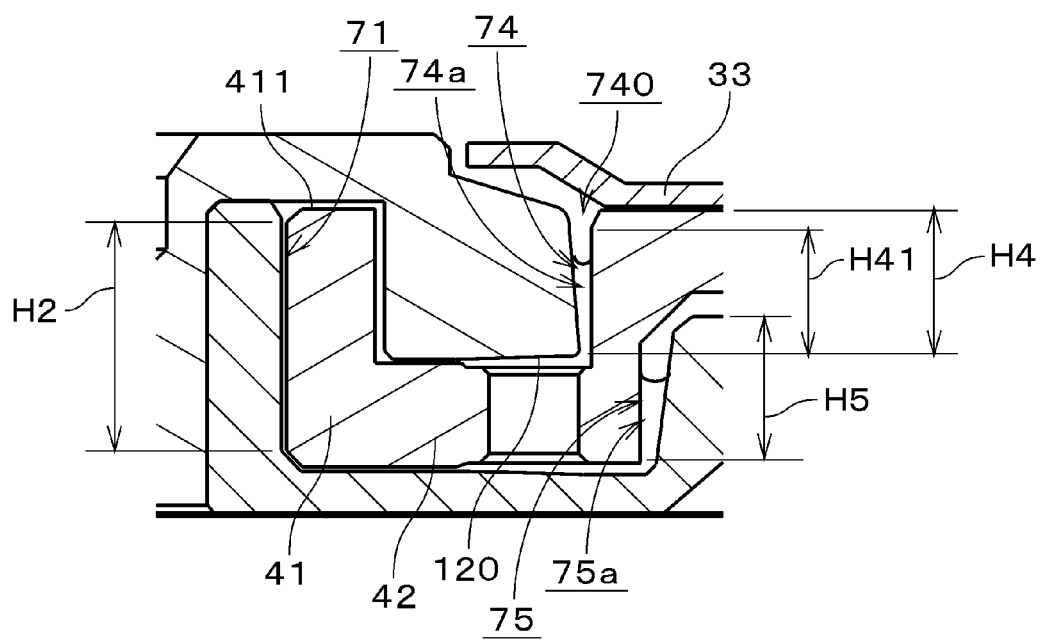
FIG. 6 is a cross-sectional view of the bearing mechanism according to a preferred embodiment of the present invention.

As shown in FIG. 6, a possible existing range H41 in the axial direction of the upper seal portion 74a preferably radially overlaps with the existing range H2 in the axial direction of the radial gap 71 over the entire length. The possible existing range H41 represents a range in the axial direction from a bottom position of the upper seal gap 74 to the upper limit of a position where the surface of the lubricating oil 120 can be provided. In addition, an upper end of the possible existing range H41 of the upper seal portion 74a may also conform or nearly conform to the surface of the lubricating oil 120 in the axial direction. Similarly, a possible existing range H5 in the axial direction of the lower seal portion 75a preferably radially overlaps with the existing range H2 of the radial gap 71 over almost the entire length. The possible existing range H5 represents a range in the axial direction from a bottom position of the lower seal gap 75 to the upper limit of a position where the surface of the lubricating oil 120 can be provided. Further, a portion of the possible existing range H41 of the upper seal portion 74a radially overlaps with the possible existing range H5 of the lower seal portion 75a. In addition, an upper end of the possible existing range H5 of the lower seal portion 75a may also nearly conform to the surface of the lubricating oil 120 in the axial direction. The same also applies to the following preferred embodiments.

As shown in FIG. 3, in the bearing mechanism 123, the lubricating oil 120 is preferably continuously filled in the upper seal gap 74, the upper thrust gap 72, the vertical connection gap 762, the lateral connection gap 761, the radial gap 71, the lower thrust gap 73, the lower seal gap 75, and the communicating hole 421.

Figure 7:
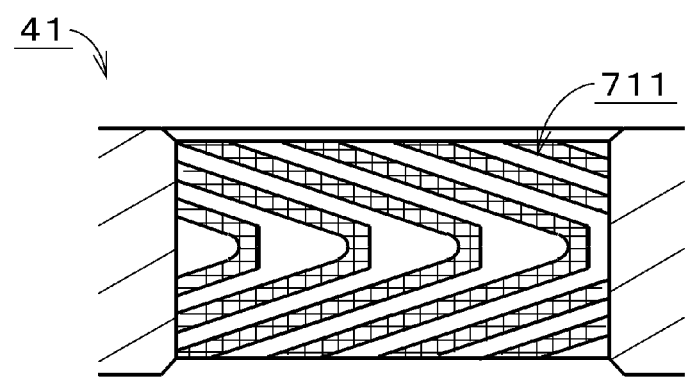
FIG. 7 is a cross-sectional view of an inner sleeve cylindrical portion according to a preferred embodiment of the present invention.

FIG. 7 is a cross-sectional view of the inner sleeve cylindrical portion 41. In FIG. 7, the shape of the inner sleeve cylindrical portion 41 on the back side of the plane of paper in the drawing is also shown. The inner circumferential surface of the inner sleeve cylindrical portion 41 preferably includes a radial dynamic pressure generating groove array 711. In FIG. 7, dynamic pressure generating grooves are cross-hatched. Hereinafter, also in other drawings, the dynamic pressure generating grooves are cross-hatched. The radial dynamic pressure generating groove array 711 is preferably an aggregate of herringbone-shaped grooves, that is, a plurality of grooves of a substantial V-shape arranged sideways along the circumferential direction of the inner circumferential surface.

In the radial gap 71 shown in FIG. 4, a radial dynamic pressure bearing portion 715 which generates fluid dynamic pressure on the lubricating oil 120 in the radial direction is preferably defined by the radial dynamic pressure generating groove array 711.

Figure 8:
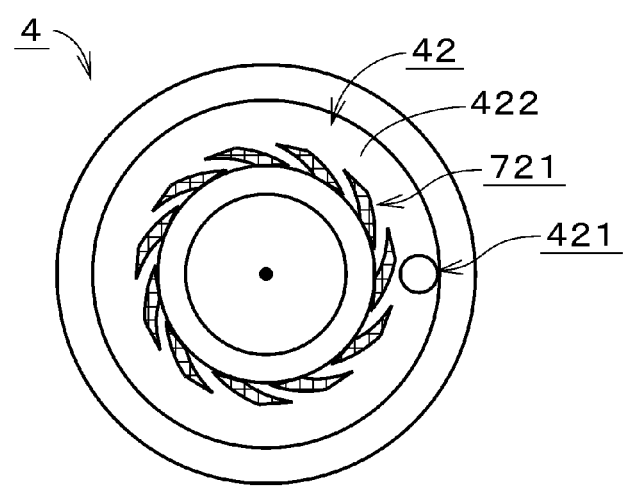
FIG. 8 is a plan view of a sleeve section according to a preferred embodiment of the present invention.

FIG. 8 is a plan view of the sleeve portion 4. In the upper surface 422 of the sleeve flange portion 42, an upper thrust dynamic pressure generating groove array 721 of a spiral shape is defined. The upper thrust dynamic pressure generating groove array 721 is preferably defined in a radially inner area than the upper opening of the communicating hole 421. However, a portion of the upper thrust dynamic pressure generating groove array 721 may also overlap with the opening of the communicating hole 421. In the upper thrust gap 72 shown in FIG. 5, an upper thrust dynamic pressure bearing portion 725 which generates fluid dynamic pressure on the lubricating oil 120 in the axial direction is defined by the upper thrust dynamic pressure generating groove array 721.

Figure 9:
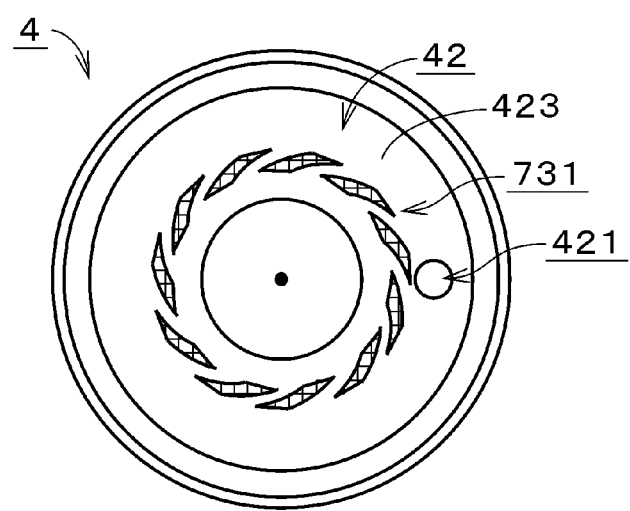
FIG. 9 is a bottom view of the sleeve section according to a preferred embodiment of the present invention.

FIG. 9 is a bottom view of the sleeve portion 4. In the lower surface 423 of the sleeve flange portion 42, a lower thrust dynamic pressure generating groove array 731 of a spiral shape is preferably defined. The lower thrust dynamic pressure generating groove array 731 is defined in an area radially inward from the lower opening of the communicating hole 421. However, a portion of the lower thrust dynamic pressure generating groove array 731 may also overlap with the opening of the communicating hole 421 if so desired. In the lower thrust gap 73 shown in FIG. 5, a lower thrust dynamic pressure bearing portion 735 which generates fluid dynamic pressure on the lubricating oil 120 in the axial direction is preferably defined by the lower thrust dynamic pressure generating groove array 731.

When the motor 12 shown in FIG. 2 is driven, the inner sleeve cylindrical portion 41 is preferably supported with respect to the outer shaft portion 61 in the radial direction by the radial dynamic pressure bearing portion 715. Further, the sleeve flange portion 42 is supported with respect to the upper plate cylindrical portion 521 and the lower plate connecting portion 621 in the axial direction by a thrust dynamic pressure bearing which is preferably defined by the upper thrust dynamic pressure bearing portion 725 and the lower thrust dynamic pressure bearing portion 735. The upper thrust dynamic pressure bearing portion 725 and the lower thrust dynamic pressure bearing portion 735 are arranged respectively above and below the sleeve flange portion 42, whereby the sleeve portion 4 can be supported in the axial direction at a position away from the central axis J1. As a result, it is possible to improve the rigidity of the bearing mechanism 123.

The disk drive apparatus 1 having the motor 12 according to the first preferred embodiment has been described above. However, in the motor 12, the existing range H2 of the radial gap 71 radially overlaps with the entirety of the possible existing range H41 of the upper seal portion 74a and almost the entirety of the possible existing range H5 of the lower seal portion 75a. In this way, it is possible to render the motor 12 slimmer.

The fixing range H1 between the inner shaft portion 51 and the outer shaft portion 61 preferably radially overlaps with the existing range H2 of the radial gap 71, whereby it is possible to obtain the axial lengths of the radial gap 71 and the fixing range H1 without making the motor 12 overly large. By lengthening the axial length of the fixing range H1, it is possible to improve the bearing rigidity of the motor 12. Further, even if an impact is applied to the motor 12, a separation of the inner shaft portion 51 and the outer shaft portion 61 is preferably prevented. By lengthening the axial length of the fixing range H1, leakage of the lubricating oil 120 from between the inner shaft portion 51 and the outer shaft portion 61 is also preferably prevented. By lengthening the axial length of the radial gap 71, it is possible to sufficiently generate radial dynamic pressure, so that it is possible to improve the bearing performance of the bearing mechanism 123.

The stator fixing portion 212 radially overlaps with the radial gap 71, whereby it is possible to make the motor 12 even slimmer. In the bearing mechanism 123, the lower seal gap is preferably arranged farther outward radially than the upper seal gap 74 and the lower surface 531 of the upper plate cylindrical portion 521 is preferably arranged lower than the upper end 641 of the lower plate cylindrical portion 622 in the axial direction. In this way, it is possible to lengthen the axial lengths of the upper seal gap 74 and the lower seal gap 75, so that it is possible to sufficiently obtain oil buffering of the lubricating oil 120 in the gaps 74 and 75. As a result, it is preferably possible to make the operating life of the motor 12 longer. In the motor 12, since the sleeve flange portion 42 is thin, it is possible to lengthen the axial length of the upper seal gap 74 while reducing the height of the motor 12. As a result, it is possible to further obtain oil buffering of the lubricating oil 120.

In the sleeve portion 4, by widening the radial width between the outer circumferential surface of the inner sleeve cylindrical portion 41 and the inner circumferential surface 431 of the outer sleeve cylindrical portion 43, it is preferably possible to widen the radial width of the upper thrust dynamic pressure generating groove array 721 defined on the sleeve flange portion 42, so that it is possible to increase the size of the upper thrust dynamic pressure bearing portion 725. Since the thickness of the inner sleeve cylindrical portion 41 is thin compared to the width between the inner sleeve cylindrical portion 41 and the outer sleeve cylindrical portion 43, it is preferably possible to easily form the inner sleeve cylindrical portion 41 when shaping the sleeve portion 4 through, for example, a forging process. The radial width of the lower surface of the upper plate connecting portion 522 is preferably greater than the axial distance between the lower surface 531 of the upper plate cylindrical portion 521 and the lower surface of the upper plate connecting portion 522. In this way, a space defined between the upper plate cylindrical portion 521, the upper plate connecting portion 522, and the inner shaft portion 51 can preferably be easily formed through, for example, cutting work.

The communicating hole 421 is preferably defined in the sleeve flange portion 42, whereby it is possible to shorten the communicating hole 421, so that it is possible to reduce flow path resistance in the communicating hole 421. Further, it is preferably possible to reduce the amount of lubricating oil 120 in the communicating hole 421, so that a change in the surface of the lubricating oil 120 in the upper seal portion 74a and the lower seal portion 75a due to the influence of the force of gravity can be suppressed.

The upper end of the outer shaft portion 61 axially comes into contact with the lower surface of the upper plate connecting portion 522, whereby it is possible to set the axial distance between the lower surface 531 of the upper plate cylindrical portion 521 and the upper surface 631 of the lower plate connecting portion 621 with high precision. As a result, it is possible to easily set the sum of the axial widths of the upper thrust gap 72 and the lower thrust gap 73. By thinning the axial thickness of the lower plate connecting portion 621, even if the motor 12 is made thin, the thickness of the sleeve flange portion 42 is preferably prevented from becoming excessively thin.

In addition, the lower surface 531 of the upper plate cylindrical portion 521 and the upper surface 631 of the lower plate connecting portion 621 can be formed in the same direction through, for example, a series of cutting works and the upper end of the outer shaft portion 61 and the upper surface of the lower plate connecting portion 621 can also be formed in the same direction through, for example, a series of cutting works. Therefore, the sum of the axial widths of the upper thrust gap 72 and the lower thrust gap 73 is preferably set with high precision. The same also applies to a preferred embodiment of the present invention shown in FIG. 13, which will be described later.

The outer circumferential surface of the lower plate cylindrical portion 622 is preferably fixed to the inner circumferential surface of the cylindrical stator fixing portion 212, whereby transmission of a vibration due to a shake of the bearing mechanism 123 to a region outer than the stator fixing portion 212 of the base plate 21 can be suppressed. Further, the step portion 213 is preferably arranged at the base plate 21, whereby it is possible to improve the rigidity of the base plate 21. As a result, transmission of a vibration of the stator 22 to the bearing mechanism 123 is preferably suppressed.

Since the inner shaft portion 51 and the outer shaft portion 61 are fitted to each other, for example, in a clearance fit, it is preferably possible to easily assemble the upper cup member 5 and the lower cup member 6. As an example of the clearance fit, the outer shaft portion 61 is inserted into the inner shaft portion 51.

Figure 10:
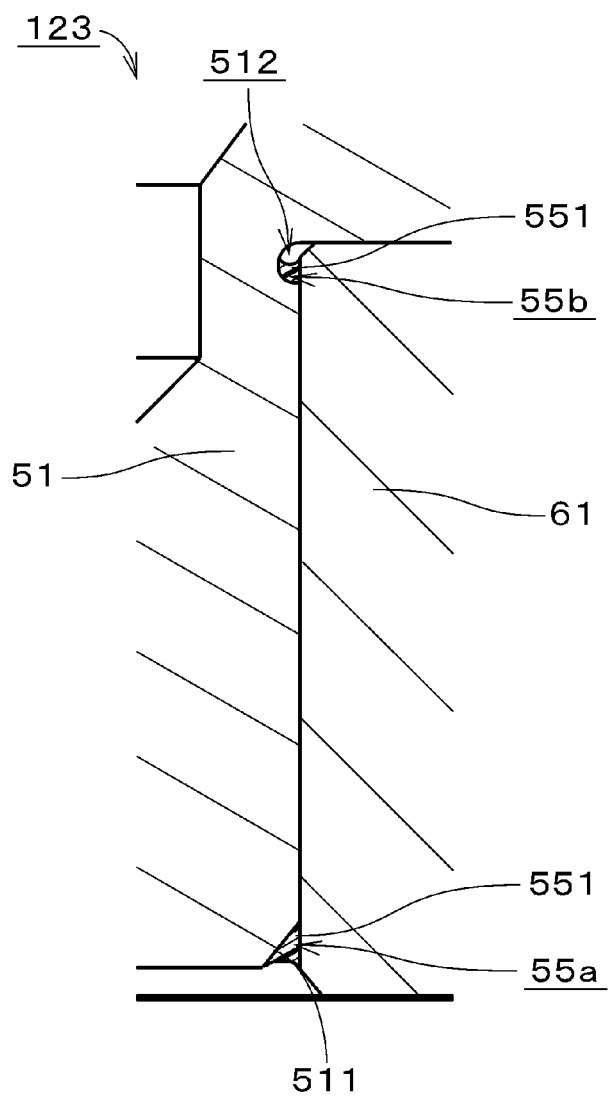
FIG. 10 is a cross-sectional view showing a portion of a bearing mechanism according to another example of a preferred embodiment of the present invention.

FIG. 10 is a drawing showing the bearing mechanism 123 according to another example of a preferred embodiment of the present invention. A lower portion of an outer peripheral portion of the inner shaft portion 51 preferably includes an inclined surface 511 which inclines radially outward as it extends upward. An upper portion of the outer peripheral portion preferably includes a concave portion 512 which is recessed radially inward. An adhesive retaining portion 55a is defined between the inclined surface 511 and a lower portion of the inner circumferential surface of the outer shaft portion 61. An adhesive retaining portion 55b is preferably provided between the concave portion 512 and an upper portion of the inner circumferential surface of the outer shaft portion 61. In this way, surplus adhesive 551 can preferably be retained in the adhesive retaining portions 55a and 55b, so that outflow of the adhesive 551 from between the inner shaft portion 51 and the outer shaft portion 61 is preferably prevented. Further, it is possible to apply a lot of adhesive 551, so that the inner shaft portion 51 and the outer shaft portion 61 can be rigidly fixed to each other.

Figure 11:
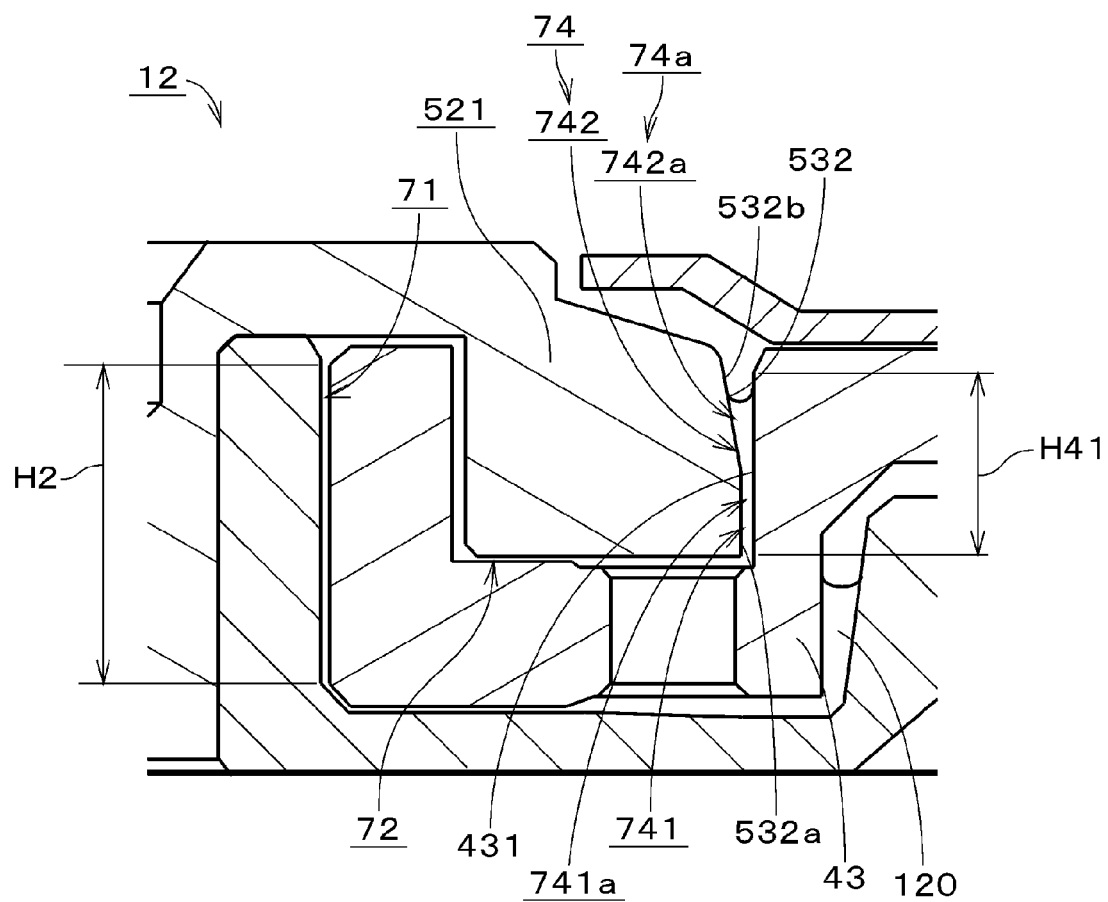
FIG. 11 is a cross-sectional view of a bearing mechanism according to still another example of a preferred embodiment of the present invention.

FIG. 11 is a drawing showing another example of a preferred embodiment of the upper seal portion. The outer circumferential surface 532 of the upper plate cylindrical portion 521 preferably includes a cylindrical surface 532a which extends in the axial direction and an inclined surface 532b which inclines radially inward as it extends upward from the cylindrical surface 532a. The upper seal gap 74 includes a gap 741 and a gap 742. The gap 741 is preferably defined between the cylindrical surface 532a and a lower portion of the inner circumferential surface 431 of the outer sleeve cylindrical portion 43. The gap 742 is preferably defined between the inclined surface 532b and an upper portion of the inner circumferential surface 431 of the outer sleeve cylindrical portion 43. The gap 741 will preferably be hereinafter referred to as a "cylindrical gap 741". The gap 742 will be referred to as a "tapered gap 742". On the cylindrical surface 532a or the inner circumferential surface 431 which faces the cylindrical surface 532a, a dynamic pressure groove array is preferably provided. In the cylindrical gap 741, a dynamic pressure generating portion 741a is arranged which preferably generates dynamic pressure headed to the upper thrust gap 72 on the lubricating oil 120 when the motor 12 is driven. In the tapered gap 742, a tapered seal portion 742a is arranged which preferably retains the lubricating oil 120 by capillary action. In FIG. 11, the upper seal portion 74a is preferably defined by the dynamic pressure generating portion 741a and the tapered seal portion 742a.

When the motor 12 is at rest, the surface of the lubricating oil 120 is preferably located in the tapered seal portion 742a. When the motor 12 is driven, the surface of the lubricating oil 120 is preferably located in the dynamic pressure generating portion 741a. The upper seal portion 74a preferably has the dynamic pressure generating portion 741a and the tapered seal portion 742a, whereby it is possible to more reliably retain the lubricating oil 120 in the upper seal gap 74. When the motor 12 is at rest, the possible existing range H41 of the upper seal portion 74a, that is, the entirety of the axial range between a bottom position of the cylindrical gap 741 and the upper limit of the surface of the lubricating oil 120 in the tapered seal portion 742a, preferably radially overlaps with the existing range H2 of the radial gap 71.

Figure 12:
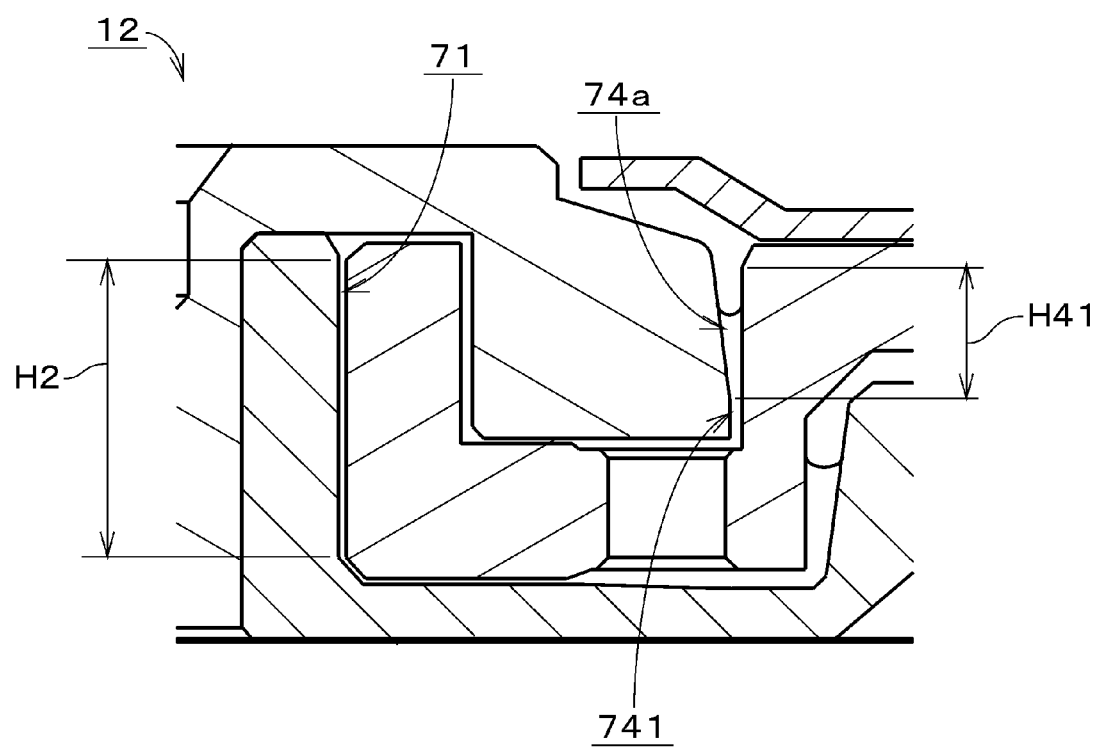
FIG. 12 is a cross-sectional view of a bearing mechanism according to still yet another example of a preferred embodiment of the present invention.

In the motor 12, as shown in FIG. 12, a minute cylindrical gap 741 which does not have a dynamic pressure generating portion may also be provided in a region below the upper seal portion 74a. The cylindrical gap 741 is preferably not included in the upper seal portion 74a. Even in this case, the possible existing range H41 of the upper seal portion 74a preferably radially overlaps with the existing range H2 of the radial gap 71, whereby it is possible to reduce the height of the motor 12.

Figure 13:
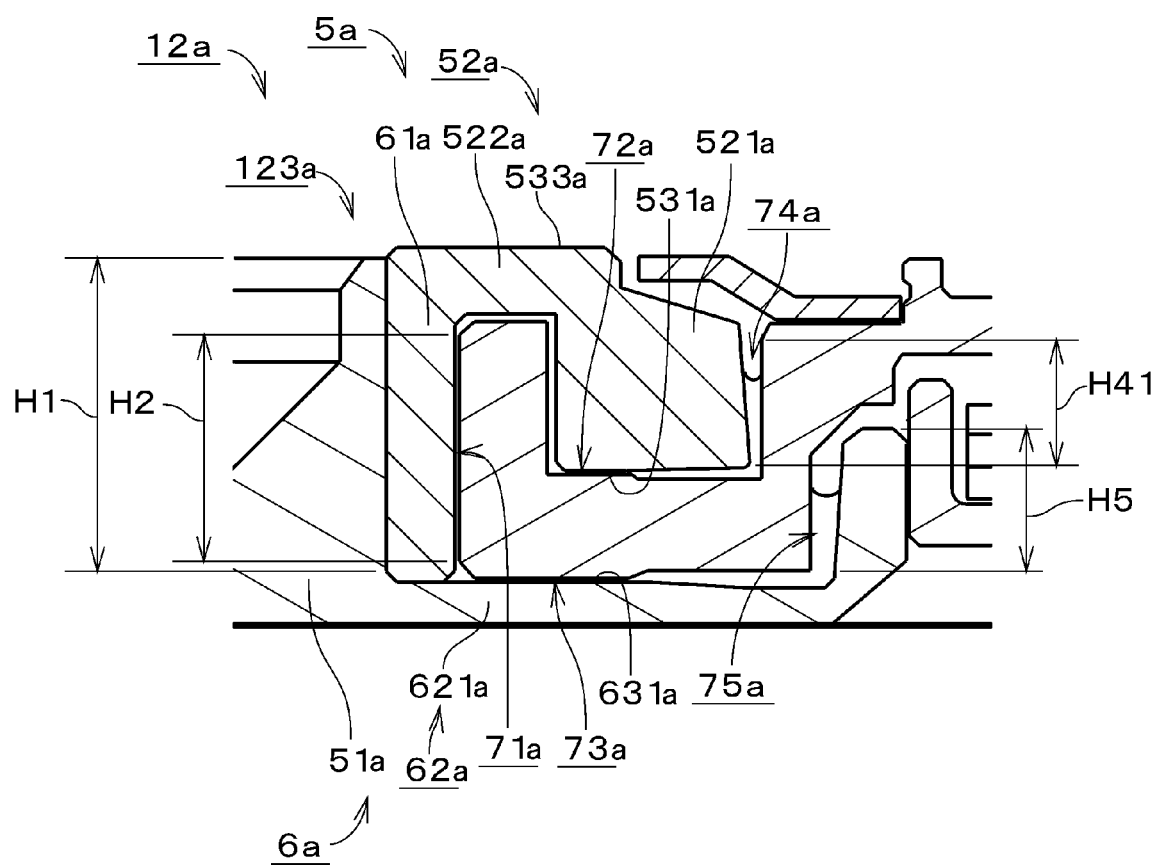
FIG. 13 is a cross-sectional view of a motor according to a second preferred embodiment of the present invention.

FIG. 13 is a drawing showing a portion of a motor 12a according to a second preferred embodiment. In the bearing mechanism 123a of the motor 12a, the outer shaft portion 61a and the upper plate portion 52a are preferably a single monolithic member. The inner shaft portion 51 and the lower plate portion 62a are preferably a single monolithic member. Hereinafter, the outer shaft portion 61a and the upper plate portion 52a will be collectively referred to as an "upper cup member 5a". The inner shaft portion 51 and the lower plate portion 62a will be collectively referred to as a "lower cup member 6a". The other structures of the motor 12a are the same as those in the first preferred embodiment. Hereinafter, the same element is denoted by the same reference numeral.

An outer peripheral portion of the inner shaft portion 51a and an inner peripheral portion of the outer shaft portion 61a are preferably, for example, adhered and fixed to each other, whereby the upper cup member 5a and the lower cup member 6a are fixed to each other. An upper surface 533a of the upper plate connecting portion 522a and the upper surface of the outer shaft portion 61a are preferably arranged higher than an upper end of the inner shaft portion 51a in the axial direction. In this way, an adhesive between the inner shaft portion 51a and the outer shaft portion 61a can preferably be prevented from running off above the upper surface 533a of the upper plate connecting portion 522a.

A lower end of the outer shaft portion 61a preferably comes into contact with the upper surface 631a of the lower plate connecting portion 621a axially. In this way, it is preferably possible to set the axial distance between the upper surface 631a of the lower plate connecting portion 621a and the lower surface 531a of the upper plate cylindrical portion 521a with high precision, so that it is possible to easily set the sum of the axial widths of the upper thrust gap 72a and the lower thrust gap 73a.

Also in the second preferred embodiment, the existing range H2 of the radial gap 71a preferably radially overlaps with the entirety of the possible existing range H41 of the upper seal portion 74a and almost the entirety of the possible existing range H5 of the lower seal portion 75a. In this way, it is possible to make the motor 12a slimmer. Further, the fixing range H1 between the inner shaft portion 51a and the outer shaft portion 61a radially overlaps with the existing range H2 of the radial gap 71a, whereby it is possible to obtain the axial lengths of the radial gap 71a and the fixing range without making the motor 12a overly large.

Figure 14:
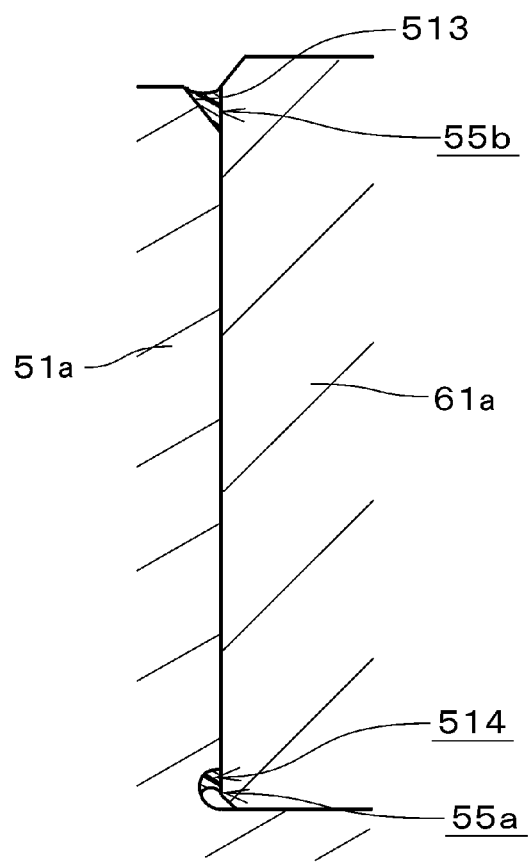
FIG. 14 is a cross-sectional view showing a portion of a bearing mechanism according to another example of a preferred embodiment of the present invention.

In the second preferred embodiment, as shown in FIG. 14, an inclined surface 513 which inclines radially inward as it extends upward may be provided at an upper portion of the outer circumferential surface of the inner shaft portion 51a and a concave portion 514 which is preferably recessed radially inward may be provided at a lower portion of the outer circumferential surface. In this way, an adhesive retaining portion 55b is preferably defined between the inclined surface 513 and an upper portion of the inner circumferential surface of the outer shaft portion 61a and an adhesive retaining portion 55a is preferably provided between the concave portion 514 and a lower portion of the inner circumferential surface of the outer shaft portion 61a.

Figure 15:
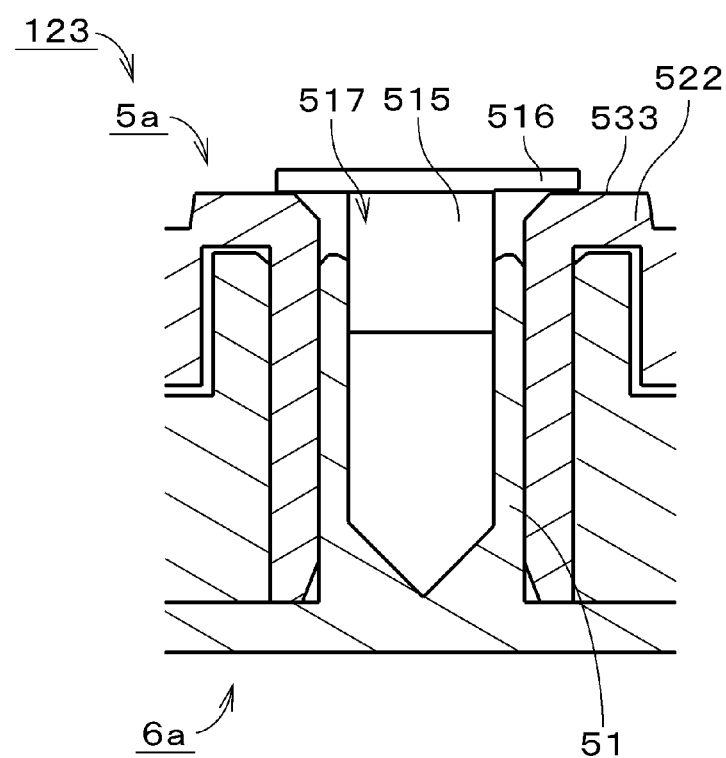
FIG. 15 is a cross-sectional view showing a bearing mechanism according to still another example of a preferred embodiment of the present invention.
Figure 16:
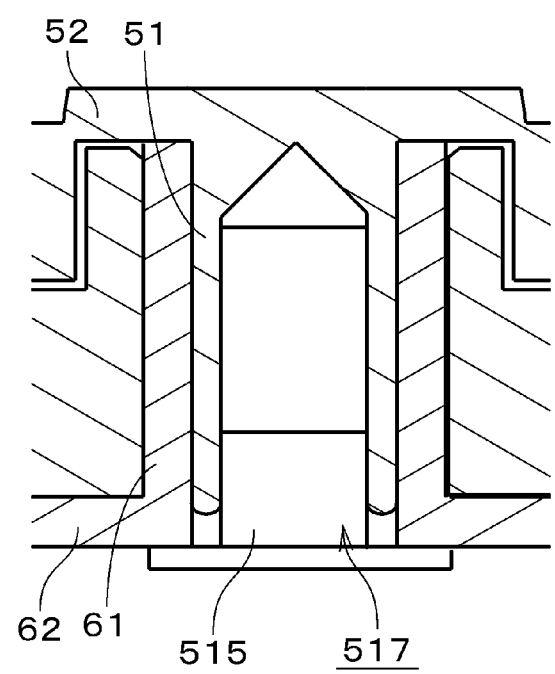
FIG. 16 is a cross-sectional view showing a bearing mechanism according to still yet another example of a preferred embodiment of the present invention.

FIG. 15 is a drawing showing the bearing mechanism 123 according to another example of a preferred embodiment of the present invention. The inner shaft portion 51 preferably has a male screw 515. The male screw 515 is screwed into a screw hole 517 which extends downward from the upper surface of the inner shaft portion 51. A screw flange portion 516 which is a head portion of the male screw 515 preferably comes into contact with the upper surface 533 of the upper plate connecting portion 522 axially. With the male screw 515 provided, the upper cup member 5a and the lower cup member 6a are rigidly fixed to each other. A region where a C-ring is mounted may be preferably provided at an upper portion of the screw flange portion 516 and the second housing member 142 may be fixed by making it fit into the C-ring with the screw flange portion 516. As shown in FIG. 16, in a case where the inner shaft portion 51 and the upper plate portion 52 are a single monolithic member and the outer shaft portion 61 and the lower plate portion 62 are also a single monolithic member, the screw hole 517 may be provided in a lower portion of the inner shaft portion 51 and the male screw 515 may be fixed to the lower side of the inner shaft portion 51.

Figure 17:
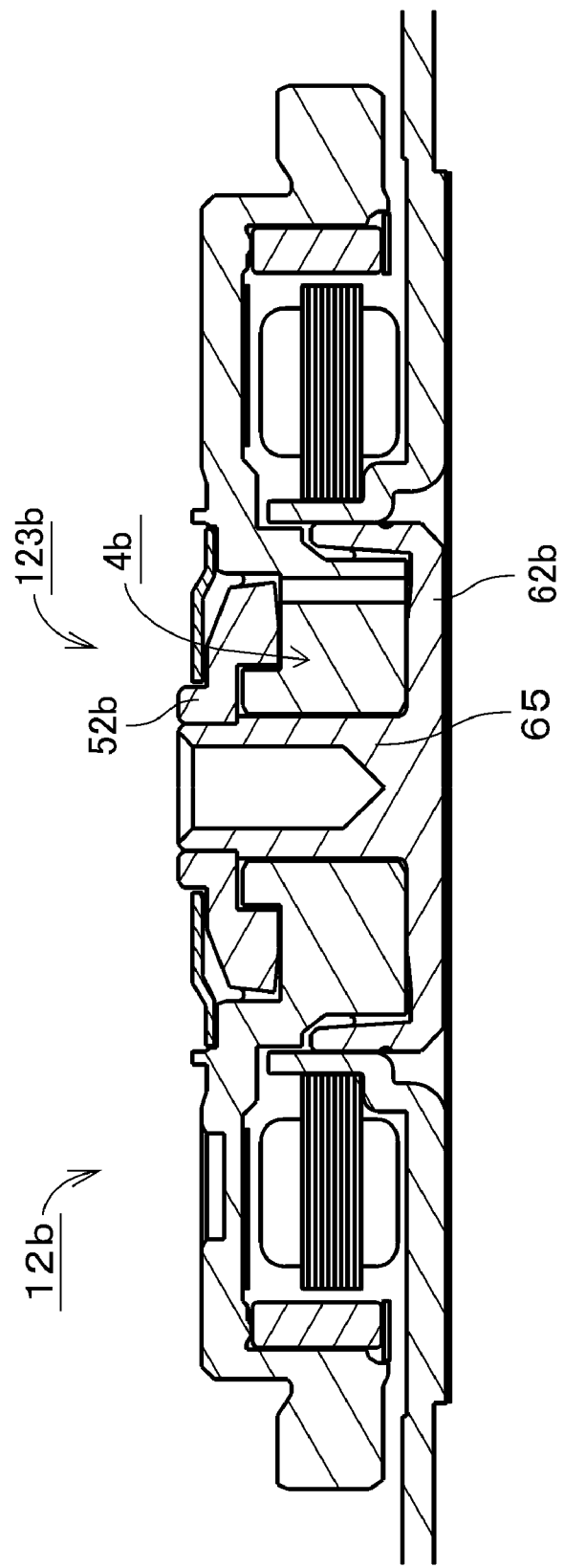
FIG. 17 is a cross-sectional view of a motor according to a third preferred embodiment of the present invention.

FIG. 17 is a drawing showing a motor 12b according to a third preferred embodiment of the present invention. The motor 12b preferably includes a bearing mechanism 123b having a structure different from the bearing mechanism 123 of the motor 12 according to the first preferred embodiment. Other structures of the motor 12b are the same as those of the motor 12. The bearing mechanism 123b124 preferably includes a shaft portion 65, a lower plate portion 62b, an upper plate portion 52b, and a sleeve portion 4b. The shaft portion 65 and the lower plate portion 62b are preferably a single monolithic member. The shaft portion 65 is preferably a separate member from the upper plate portion 52b.

Figure 18:
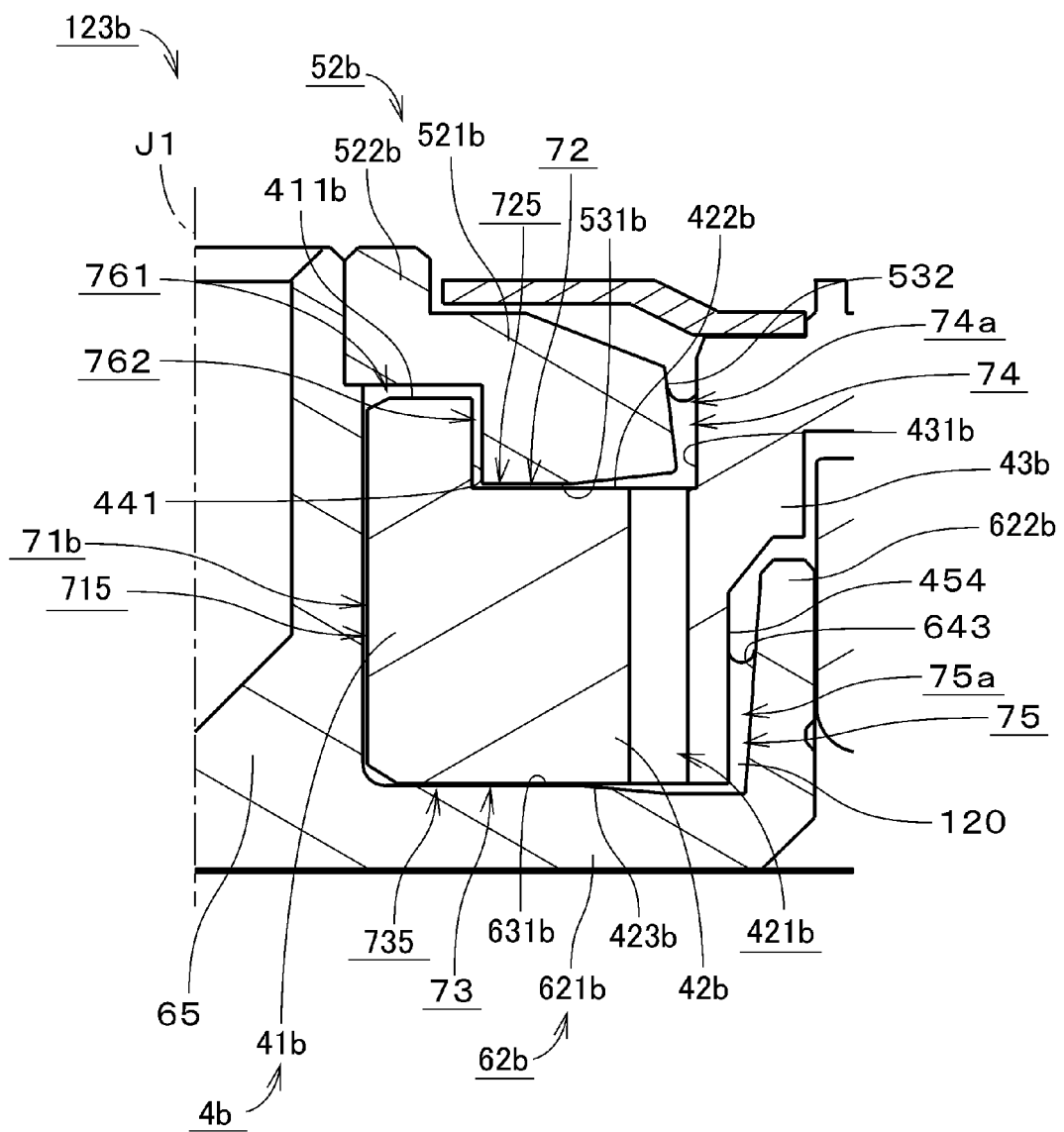
FIG. 18 is a cross-sectional view of a bearing mechanism according to a preferred embodiment of the present invention.

FIG. 18 is an enlarged view showing the bearing mechanism 123b. The lower plate portion 62b preferably includes a lower plate connecting portion 621b and a lower plate cylindrical portion 622b. The lower plate connecting portion 621b extends radially outward from a lower portion of the shaft portion 65. The lower plate cylindrical portion 622b faces upward from an outer edge portion of the lower plate connecting portion 621b. The upper plate portion 52b preferably includes an upper plate cylindrical portion 521b and an upper plate connecting portion 522b. The upper plate connecting portion 522b connects an upper portion of the shaft portion 65 and an upper portion of the upper plate cylindrical portion 521b.

The sleeve portion 4b preferably includes an inner sleeve cylindrical portion 41b, a sleeve flange portion 42b, and an outer sleeve cylindrical portion 43b. The inner sleeve cylindrical portion 41b is a portion defining a cylindrical inner circumferential surface centered on the central axis J1. The shaft portion 65 is preferably inserted into the inner side of the inner sleeve cylindrical portion 41b. The sleeve flange portion 42b extends radially outward from the inner sleeve cylindrical portion 41b. The sleeve flange portion 42b preferably includes a communicating hole 421b penetrating through the sleeve flange portion 42b in the vertical direction. The outer sleeve cylindrical portion 43b faces upward from an outer edge portion of the sleeve flange portion 42b. In the sleeve portion 4b, the radial width between an outer circumferential surface 441 of the inner sleeve cylindrical portion 41b, that is, a cylindrical surface which is arranged above the sleeve flange portion 42 band is centered on the central axis J1, and an inner circumferential surface 431b of the outer sleeve cylindrical portion 43b is preferably greater than the radial thickness of the inner sleeve cylindrical portion 41b, that is, the radial width between the outer circumferential surface 441 and the inner circumferential surface of the inner sleeve cylindrical portion 41b.

The radial gap 71b is defined between the outer circumferential surface of the shaft portion 65 and the inner circumferential surface of the inner sleeve cylindrical portion 41b. In the radial gap 71b, the radial dynamic pressure bearing portion 715 is preferably defined by the radial dynamic pressure generating groove array 711 which is the same as that in FIG. 7. The lateral connection gap 761 which extends in the radial direction is preferably defined between an upper surface 411b of the inner sleeve cylindrical portion 41b and the lower surface of the upper plate connecting portion 542b. The vertical connection gap 762 extending in the vertical direction is defined between the outer circumferential surface 441 of the inner sleeve cylindrical portion 41b and the inner circumferential surface of the upper plate cylindrical portion 521b.

The upper thrust gap 72 is preferably defined between an area arranged farther inward radially than the communicating hole 421b of an upper surface 422b of the sleeve flange portion 42b and a lower surface 531b of the upper plate cylindrical portion 521b. In the upper thrust gap 72, the upper thrust dynamic pressure bearing portion 725 is preferably defined by the upper thrust dynamic pressure generating groove array 721 which is the same as that in FIG. 8. The lower thrust gap 73 is preferably defined between an area arranged farther inward radially than the communicating hole 421b of a lower surface 423b of the sleeve flange portion 42b and an upper surface 631b of the lower plate connecting portion 621b. In the lower thrust gap 73, the lower thrust dynamic pressure bearing portion 735 is preferably defined by the lower thrust dynamic pressure generating groove array 731 which is the same as that in FIG. 9. The upper thrust gap 72 and the lower thrust gap 73 preferably communicate with each other by the communicating hole 421b.

The upper seal gap 74 which is open upward is preferably defined between the outer circumferential surface 532 of the upper plate cylindrical portion 521b and the inner circumferential surface 431b of the outer sleeve cylindrical portion 43b. The radial width of the upper seal gap 74 gradually increases as it extends upward. In the upper seal gap 74, the upper seal portion 74a, in which the surface of the lubricating oil 120 is located, is defined.

The lower seal gap 75 which is open upward is preferably defined between an inner circumferential surface 643 of the lower plate cylindrical portion 622b and an outer circumferential surface 454 of the sleeve flange portion 42b. The radial width of the lower seal gap 75 gradually increases as it extends upward. In the lower seal gap 75, the lower seal portion 75a, in which the surface of the lubricating oil 120 is located, is defined.

Figure 19:
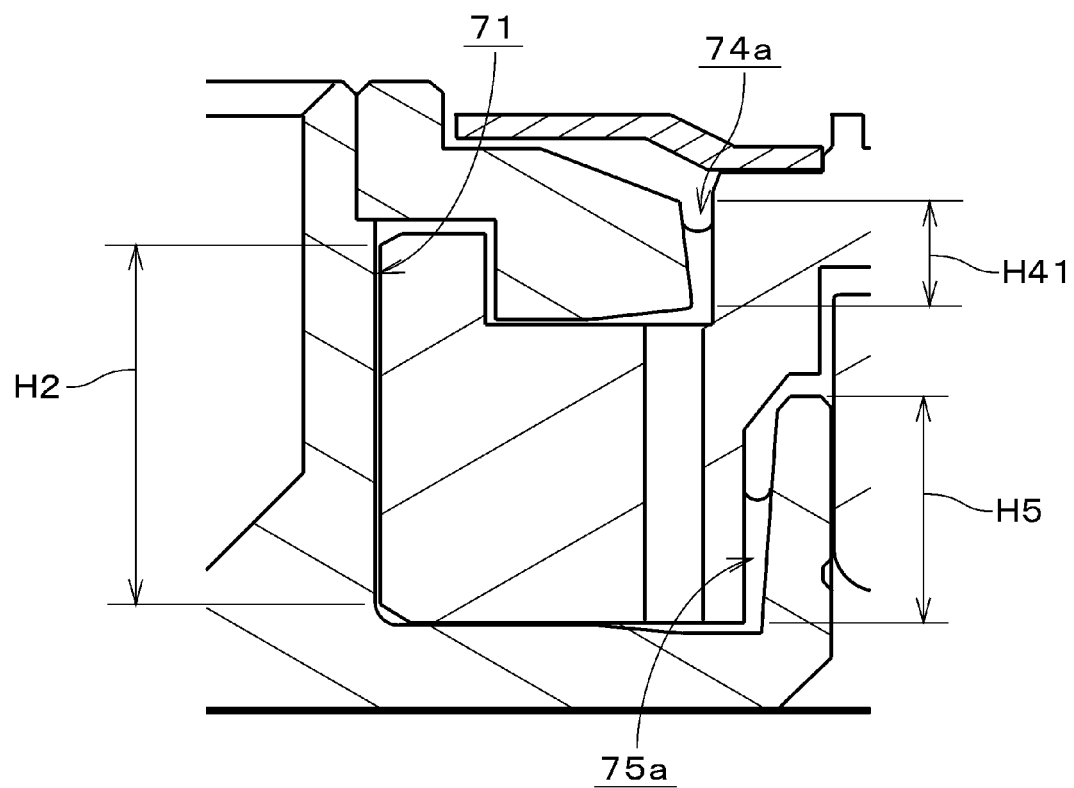
FIG. 19 is a cross-sectional view of the bearing mechanism according to a preferred embodiment of the present invention.

As shown in FIG. 19, the existing range H2 in the axial direction of the radial gap 71b radially overlaps with almost the entirety of the possible existing range H41 in the axial direction of the upper seal portion 74a. Further, the existing range H2 of the radial gap 71b preferably radially overlaps with almost the entirety of the possible existing range H5 in the axial direction of the lower seal portion 75a.

Also in the third preferred embodiment, similarly to the first preferred embodiment, the existing range H2 of the radial gap 71b preferably radially overlaps with the possible existing range H41 of the upper seal portion 74a and the possible existing range H5 of the lower seal portion 75a, whereby it is preferably possible to make the motor 12b slimmer. By widening the radial width between the inner sleeve cylindrical portion 41b and the outer sleeve cylindrical portion 43b, it is preferably possible to widen the radial width of the upper thrust dynamic pressure bearing portion 725. Further, since the radial thickness of the inner sleeve cylindrical portion 41b is preferably thin compared to the width, it is possible to easily form an upper portion of the inner sleeve cylindrical portion 41b when shaping the sleeve portion 4b through, for example, a forging process. Since the shaft portion 65 and the upper plate portion 52b are of preferably defined by separate members, the processing of the upper plate portion 52b becomes simple.

Figure 20:
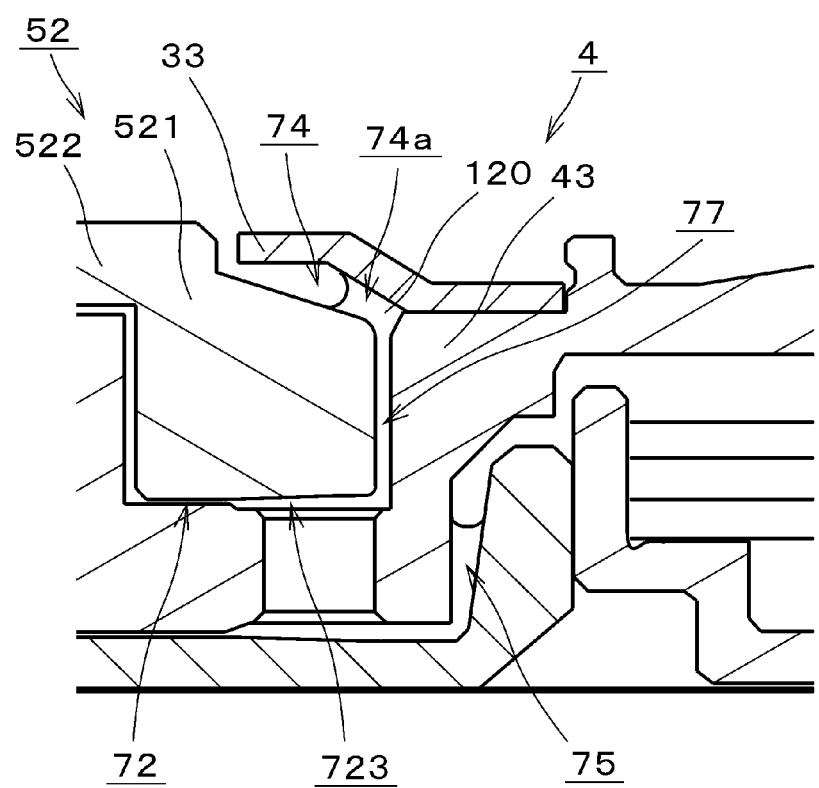
FIG. 20 is a drawing showing another example of an upper seal portion according to a preferred embodiment of the present invention.

FIG. 20 is a diagram showing another example of the upper seal portion 74a in accordance with a preferred embodiment of the present invention. The structures of the motor other than the upper seal portion 74a are the same as those in FIG. 3, FIG. 13, or the like. In FIG. 20, the upper seal portion 74a is preferably defined in the upper seal gap 74 between the upper surface of the upper plate portion 52 and the lower surface of the seal cap 33. The seal cap 33 extends radially inward from an outer peripheral portion of the sleeve portion 4 in a region above the upper plate portion 52, similarly to FIG. 3. In this way, it is preferably possible to make the axial width of the upper seal portion 74a small. Further, it is preferably possible to more reliably prevent leakage of the lubricating oil 120 by using a centrifugal force during rotation.

In detail, the seal cap 33 extends radially inward from an upper portion of the outer sleeve cylindrical portion 43. A vertical gap 77 is preferably defined between the outer circumferential surface of the upper plate cylindrical portion 521 and the inner circumferential surface of the outer sleeve cylindrical portion 43. In the vertical gap 77, the lubricating oil 120 preferably continuously exists from the upper thrust gap 72. The outer circumferential surface of the upper plate cylindrical portion 521 is a cylindrical surface. The upper seal portion 74a is preferably defined between the upper surface of the upper plate cylindrical portion 521 and the lower surface of the seal cap 33. The upper seal gap 74 has an axial width which gradually increases radially inward, and inclines upward.

Figure 21:
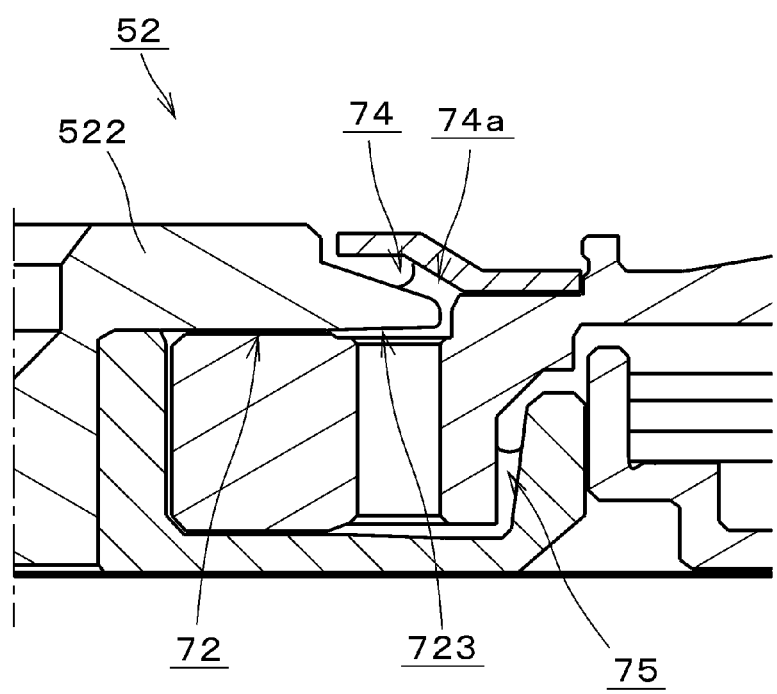
FIG. 21 is a drawing showing still another example of the upper seal portion according to a preferred embodiment of the present invention.

FIG. 21 is a drawing showing an example in which a motor is preferably made even slimmer by making the axial length of the vertical gap 77 small and omitting the upper plate cylindrical portion 521 in the structure shown in FIG. 20. In FIG. 21, the vertical gap 77 in FIG. 20 hardly exists. In the upper plate portion 52, the lower surface of the upper plate connecting portion 522 in FIG. 20 is preferably continuous with the outer periphery of the upper plate portion 52.

In the structures shown in FIGS. 20 and 21, by making the axial width of the upper seal portion 74a small, increasing axial widths in structures other than the upper seal portion 74a of the bearing mechanism becomes simple. As a result, securing of the rigidity of a member or improvement in impact resistance of the member becomes simple.

In addition, by greatly inclining the upper seal gap 74, it is preferably possible to make an opening of the upper seal gap 74 large. That is, it becomes possible to retain a lot of lubricating oil 120 in the upper seal gap 74. Therefore, by making a clearance spread angle in the upper seal gap 74 larger than in the lower seal gap 75, it is possible to reduce the amount of lubricating oil in the upper seal gap 74 during rest. In this way, it is preferably possible to improve impact resistance during rest.

In the lower seal gap 75, a groove for pushing the lubricating oil downward during rotation is formed, so that during rotation, an appropriate amount of the lubricating oil is retained in the upper seal gap 74 and the lower seal gap 75. The volume of the lubricating oil which is retained in the upper seal gap 74 during rotation is greater than the volume of a space 723 on the radial outside of the upper thrust gap 72. With such a structure, it is preferably possible to increase the inner pressure of the bearing by using a centrifugal force applied to the lubricating oil in the upper seal portion 74a during rotation, so that it is preferably possible to suppress the generation of air bubbles. A groove arranged to scrape out air bubbles may also preferably be provided in the surfaces defining the space 723.

Figure 22:
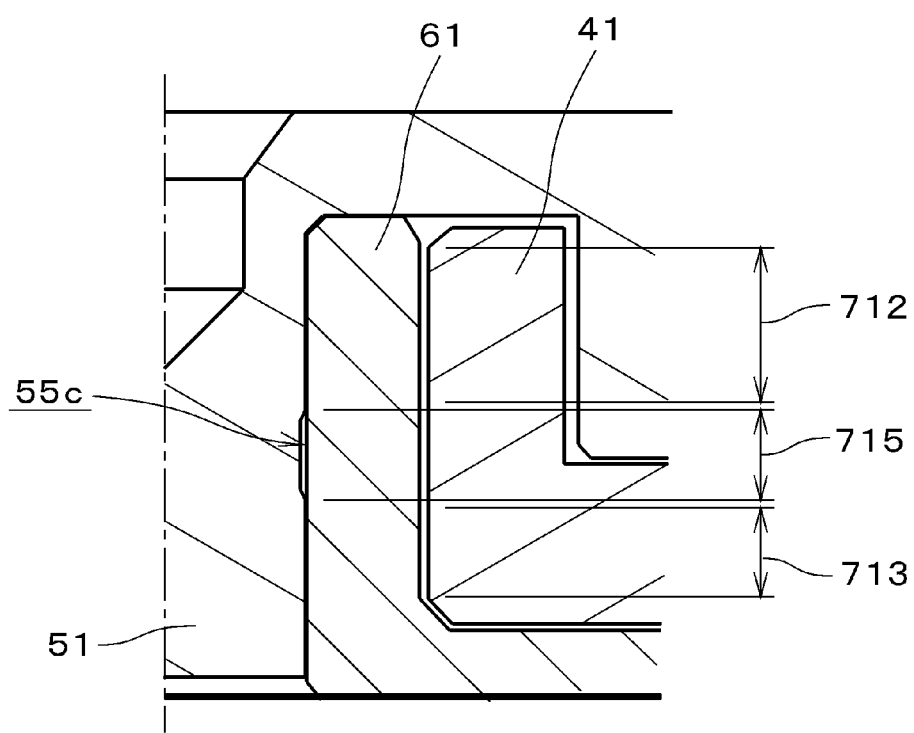
FIG. 22 is a drawing showing another example of an adhesive retaining portion according to a preferred embodiment of the present invention.

FIG. 22 is a diagram showing another example of the adhesive retaining portion which is provided between the inner peripheral portion of the inner shaft portion 51 and the outer peripheral portion of the outer shaft portion 61 in accordance with a preferred embodiment of the present invention. The structures of the motor other than a region shown in FIG. 22 are preferably the same as those in FIG. 3. In addition, the relationship between the inner shaft portion 51 and the outer shaft portion 61 may also be the same as shown in FIG. 13.

In FIG. 22, the radial dynamic pressure generating groove array in the inner circumferential surface of the inner sleeve cylindrical portion 41 is divided into upper and lower portions. That is, the radial dynamic pressure generating groove array defines an upper radial dynamic pressure generating groove array 712 and a lower radial dynamic pressure generating groove array 713. Each of the upper radial dynamic pressure generating groove array 712 and the lower radial dynamic pressure generating groove array 713 is preferably an aggregate of herringbone-shaped grooves, that is, a plurality of grooves of a substantial V-shape arranged sideways along the circumferential direction of the inner circumferential surface. In FIG. 22, an axial range in which the upper radial dynamic pressure generating groove array 712 exists is denoted by reference numeral 712, and an axial range in which the lower radial dynamic pressure generating groove array 713 exists is denoted by reference numeral 713.

On the other hand, an adhesive retaining portion 55c is preferably arranged between the upper radial dynamic pressure generating groove array 712 and the lower radial dynamic pressure generating groove array 713 in the axial direction. In FIG. 22, an existing range in the axial direction of the adhesive retaining portion 55c is denoted by reference numeral 715. In order to provide the adhesive retaining portion 55c, a concave portion which is recessed radially inward is preferably arranged in the outer circumferential surface of the inner shaft portion 51. A concave portion which is recessed radially outward may also be provided in the inner circumferential surface of the outer shaft portion 61.

In a case where the inner shaft portion 51 and the outer shaft portion 61 are adhered and fixed to each other, there is a concern that the outer shaft portion 61 may be deformed by stress due to an adhesive. Therefore, by disposing the adhesive retaining portion 55c between the upper radial dynamic pressure generating groove array 712 and the lower radial dynamic pressure generating groove array 713, the effect of stress due to an adhesive on the radial dynamic pressure bearing portion is preferably reduced. Further, a fastening strength between the inner shaft portion 51 and the outer shaft portion 61 is also preferably improved due to an anchor effect by the adhesive retaining portion 55*c*.

Figure 23:
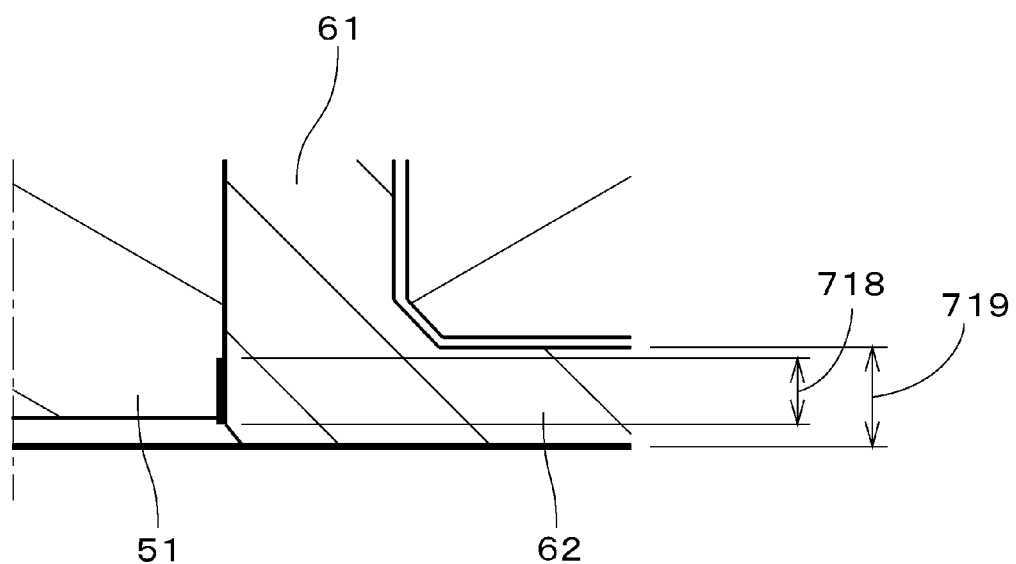
FIG. 23 is a drawing showing a fastening structure between an inner shaft portion and an outer shaft portion according to a preferred embodiment of the present invention.

FIG. 23 is a drawing showing another example of a fastening structure between the inner shaft portion 51 and the outer shaft portion 61 and illustrates lower portions of the inner shaft portion 51 and the outer shaft portion 61 in accordance with a preferred embodiment of the present invention. The diameter of the inner circumferential surface of the outer shaft portion 61 is preferably slightly smaller than that of the other region of a lower end of the inner shaft portion 51. In FIG. 23, an aspect in which the diameter of the inner circumferential surface is slightly small is expressed by a thick line. Due to such a structure, the lower end of the inner shaft portion 51 and the outer shaft portion 61 are preferably fixed to each other in an interference fit. The interference fit may preferably be obtained by, for example, press fitting and may also be obtained by other methods such as shrinkage fitting. In the other area between the inner shaft portion 51 and the outer shaft portion 61, these portions are preferably fixed to each other with, for example, an adhesive.

In FIG. 23, an interference fit range which is an axial range of a fixing region of the inner shaft portion 51 and the outer shaft portion 61 which is in the interference fit is denoted by reference numeral 718. The interference fit range 718 is included in a boundary portion range 719 which is an axial range of a boundary portion between the lower plate portion 62 and the outer shaft portion 61. Here, the axial range of the boundary portion is the minimum width in the axial direction of an inner peripheral portion of the lower plate portion 62. In the case of FIG. 23, the axial range of the boundary portion is preferably the same as the thickness of the inner peripheral portion of the lower plate portion 62. In addition, the interference fit range 718 may not be necessarily included in the boundary portion range 719 and the interference fit range 718 may alternatively be arranged closer to the lower plate portion 62 than the radial dynamic pressure generating groove array 711.

The inner shaft portion 51 is preferably fixed to the outer shaft portion 61 in the interference fit, whereby when fixing the inner shaft portion 51 and the outer shaft portion 61 to each other with an adhesive, both of the portions no longer have to be held for a long time with, for example, a jig. That is, it is possible to use provisional fixing by the interference fit. In particular, in a case where both of the portions are fixed to each other by, for example, an epoxy-based adhesive, a complication of the process or deterioration of work tact due to jig fixing during baking is preferably prevented. Baking of an adhesive in a separate process can also be easily performed together. As a result, productivity is improved.

The interference fit range 718 in the axial direction is preferably arranged closer to the lower plate portion 62 than the radial dynamic pressure generating groove array 711, whereby swelling of the outer shaft portion 61 due to the interference fit can preferably be prevented and NRRO (Non-Repeatable RunOut) or a defect in which rotation is locked can preferably be prevented.

Figure 24:
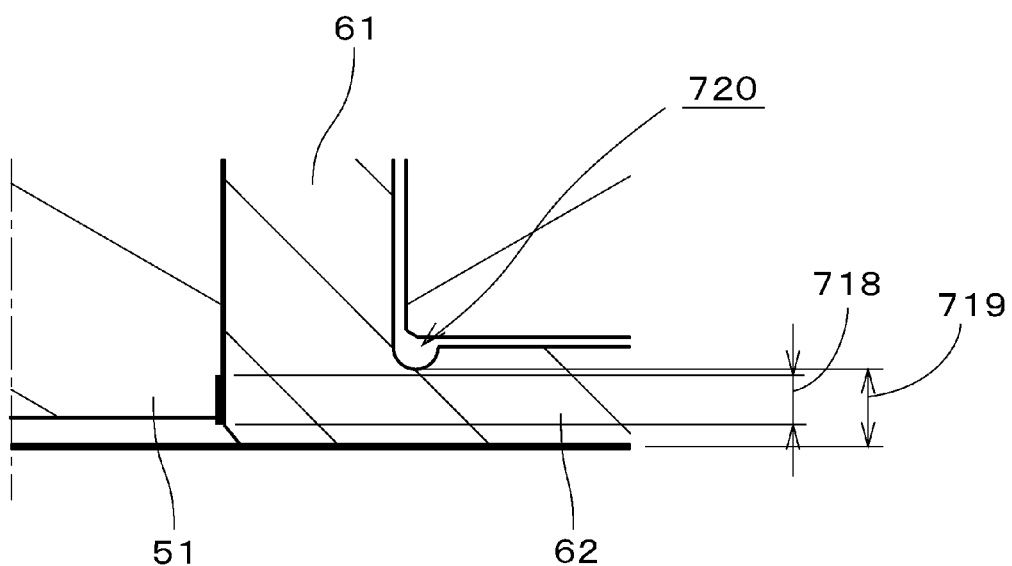
FIG. 24 is a drawing showing another example of the fastening structure between the inner shaft portion and the outer shaft portion according to a preferred embodiment of the present invention.

FIG. 24 is a drawing showing the same fastening structure as that in FIG. 23. In FIG. 24, a relief portion 720 which is recessed downward is arranged in a boundary portion between the lower plate portion 62 and the outer shaft portion 61. Due to the relief portion 720, the boundary portion range 719 becomes a range between a bottom portion of the relief portion 720 and the lower surface of the lower plate portion 62. Also in FIG. 24, the interference fit range 718 is arranged closer to the lower plate portion 62 than the radial dynamic pressure generating groove array 711. Preferably, the interference fit range 718 is included in the boundary portion range 719. In this way, a decrease in bearing performance is prevented.

In addition, as the adhesive, an epoxy-based adhesive and an anaerobic adhesive may also be used together. For example, the epoxy-based adhesive and the anaerobic adhesive are preferably applied to the outer circumferential surface of the inner shaft portion 51 or the inner circumferential surface of the outer shaft portion 61 in a manner of being shifted vertically. In this way, by the interference fit and the anaerobic adhesive, it is possible to make provisional fixing before baking stronger. For example, the anaerobic adhesive is preferably applied to the lower side than the epoxy-based adhesive.

In FIGS. 23 and 24, the lower plate portion 62 and the outer shaft portion 61 are preferably a single monolithic member. However, the fastening structures shown in FIGS. 23 and 24 can also be applied to the case of FIG. 13, that is, a case where the upper plate portion 52 and the outer shaft portion 61 form a single monolithic member. In this case, the interference fit range is preferably arranged closer to the upper plate portion 52 than the radial dynamic pressure generating groove array 711. Preferably, the interference fit range is included in an axial range of a boundary portion between the upper plate portion 52 and the outer shaft portion 61.

Figure 25:
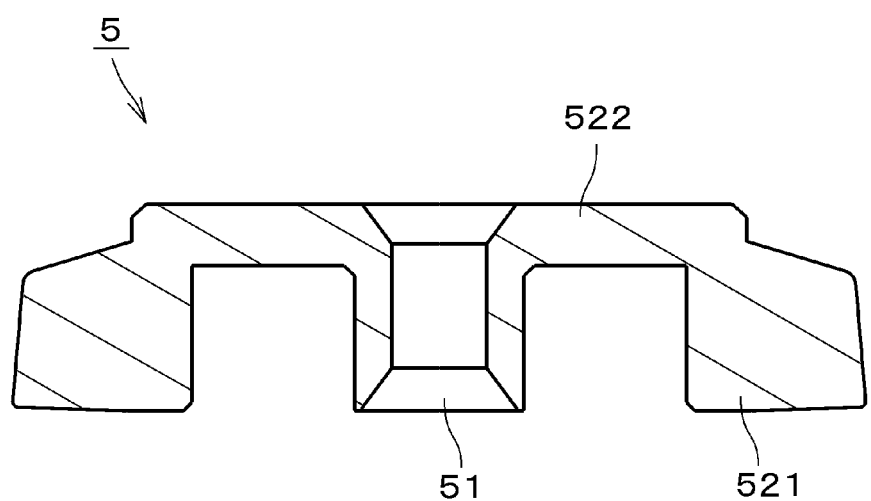
FIG. 25 is a drawing showing still another example of the fastening structure between the inner shaft portion and the outer shaft portion according to a preferred embodiment of the present invention.
Figure 26:
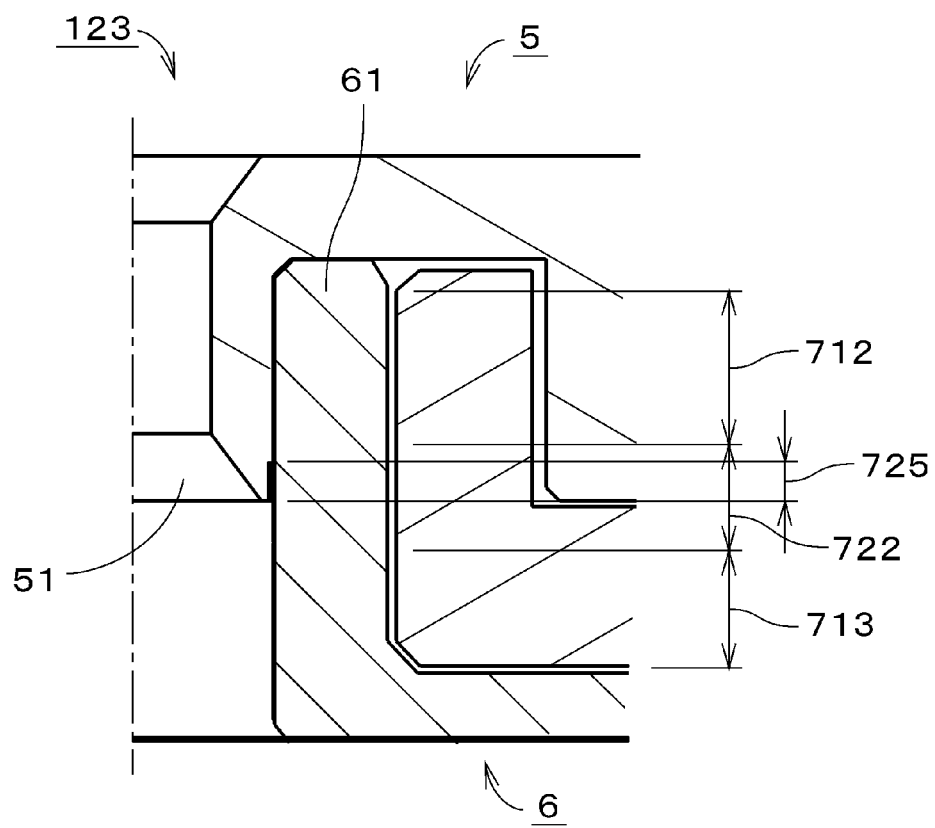
FIG. 26 is a drawing showing another example of the bearing mechanism according to a preferred embodiment of the present invention.

FIG. 25 is a drawing showing another example of the upper cup member 5 in accordance with a preferred embodiment of the present invention. FIG. 26 is a cross-sectional view of the bearing mechanism 123 which includes the upper cup member 5 shown in FIG. 25. The upper cup member 5 is different from that shown in FIG. 3 in that the inner shaft portion 51 is short compared to that shown in FIG. 3. The radial dynamic pressure generating groove array includes the upper radial dynamic pressure generating groove array 712 and the lower radial dynamic pressure generating groove array 713, similarly to the case of FIG. 22, and existing ranges in the axial direction of these groove arrays are respectively denoted by reference numerals 712 and 713. Similarly to the case of FIG. 23, the diameter of the inner circumferential surface of the outer shaft portion 61 is preferably slightly smaller than that of the other region of the lower end of the inner shaft portion 51. In FIG. 26, an aspect in which the diameter of the inner circumferential surface is slightly small is expressed by a thick line. Due to such a structure, the lower end of the inner shaft portion 51 and the outer shaft portion 61 are preferably fixed to each other in an interference fit. In the other area in the axial direction, these portions are fixed to each other with an adhesive. Other structures of the motor are the same as those in FIG. 2.

The inner shaft portion 51 is preferably fixed to the outer shaft portion 61 in the interference fit, whereby similarly to the case of FIG. 23, when fixing the inner shaft portion 51 and the outer shaft portion 61 to each other with an adhesive, both of the portions no longer have to be held for a long time with, for example, a jig, so that productivity is improved.

Further, an interference fit range 725 which is an axial range of a fixing region by the interference fit is preferably included in a range 722 between the upper radial dynamic pressure generating groove array 712 and the lower radial dynamic pressure generating groove array 713. In this way, a decrease in shape accuracy of the upper and lower radial dynamic pressure bearing portions due to the interference fit is preferably suppressed.

In addition, such a fastening structure can also be applied to a case where the inner shaft portion 51 and the lower plate portion 62 are a single monolithic member and the outer shaft portion 61 and the upper plate portion 52 are a single monolithic member. In this case, an upper end of the inner shaft portion 51 is fixed to the outer shaft portion 61 in the interference fit in a range between the upper radial dynamic pressure generating groove array 712 and the lower radial dynamic pressure generating groove array 713 in the axial direction.

Further, also in a case where the inner shaft portion 51 is long similarly to FIG. 3, it is possible to adopt a method of including the interference fit range in the range between the upper radial dynamic pressure generating groove array 712 and the lower radial dynamic pressure generating groove array 713.

In the upper cup member 5 shown in FIG. 25, the axial position of the lower end of the inner shaft portion 51 and the axial position of the lower end of the upper plate cylindrical portion 521 preferably conform to each other. The lower end of the inner shaft portion 51 may also be arranged higher than the axial position of the lower end of the upper plate cylindrical portion 521. In this way, it is preferably possible to easily and accurately process the lower surface of the upper plate cylindrical portion 521 without interfering with the inner shaft portion 51. As a result, improvements in yield and a reduction in manufacturing costs can preferably be realized.

Figure 27:
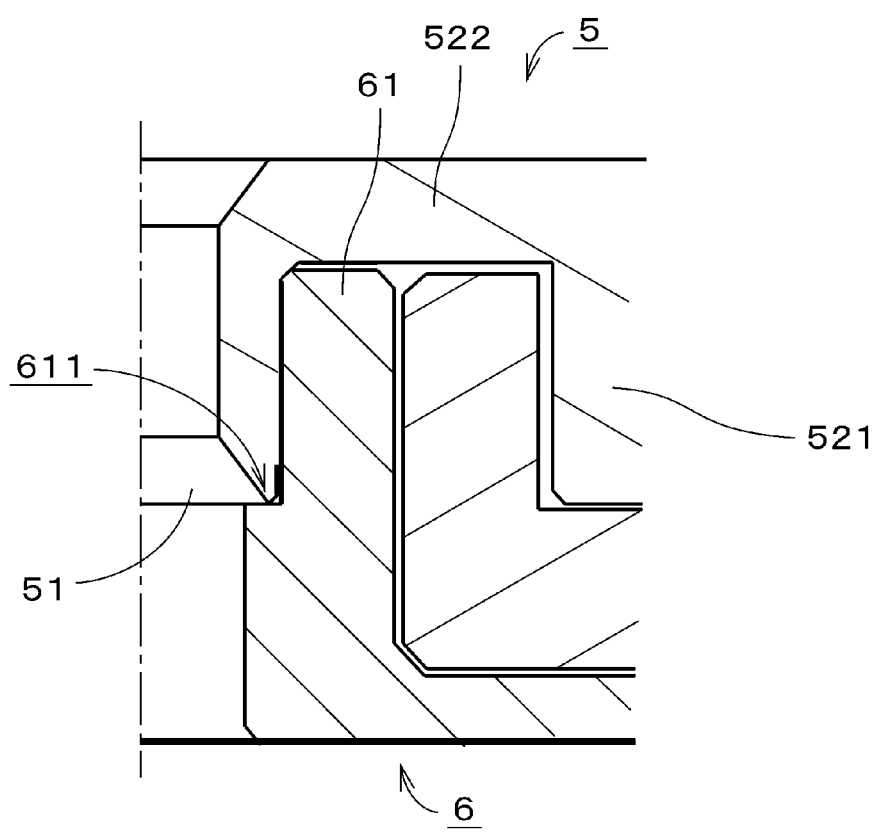
FIG. 27 is a drawing showing still another example of the bearing mechanism according to a preferred embodiment of the present invention.

FIG. 27 is a drawing showing another example of fixing the upper cup member 5 shown in FIG. 25 to the lower cup member 6 in accordance with a preferred embodiment of the present invention. The diameter of a lower portion of the inner circumferential surface of the outer shaft portion 61 in FIG. 27 is preferably smaller than the diameter of an upper portion. That is, a step portion 611 is preferably arranged between the upper portion and the lower portion of the inner circumferential surface. The diameter of the lower portion of the inner circumferential surface of the outer shaft portion is preferably smaller than the diameter of the outer circumferential surface of the inner shaft portion 51. The diameter of the upper portion of the inner circumferential surface of the outer shaft portion 61 is preferably almost the same as the diameter of the outer circumferential surface of the inner shaft portion 51.

Similarly to FIG. 26, the lower end of the inner shaft portion 51 and the outer shaft portion 61 are preferably fixed to each other in the interference fit. In the other area in the axial direction, these portions are fixed to each other with an adhesive. An interference fit range which is an axial range of a fixed region which is in the interference fit is preferably included in a range between the upper radial dynamic pressure generating groove array and the lower radial dynamic pressure generating groove array. In this way, a decrease in shape accuracy of the upper and lower radial dynamic pressure bearing portions due to the interference fit is preferably suppressed.

The axial positions of the lower end of the inner shaft portion 51 and the lower end of the upper plate cylindrical portion 521 preferably conform to each other. In this way, it is preferably possible to simultaneously finish the lower end of the inner shaft portion 51 and the lower end of the upper plate cylindrical portion 521 in the same polishing process. In addition, it also becomes possible to simultaneously perform polishing of the lower surface of the upper plate cylindrical portion 521 and polishing of the upper surface of the upper plate connecting portion 522. The lower end of the inner shaft portion 51 comes into contact with the surface of the step portion 611 of which a normal line is directed upward. Since the axial position of the lower end of the inner shaft portion 51 and the axial position of the lower end of the upper plate cylindrical portion 521 preferably conform to each other with high precision, the axial position of the lower surface of the upper plate cylindrical portion 521 can be determined with high precision. As a result, it is possible to set the sum of the sizes of the upper thrust gap 72 and the lower thrust gap 73 with high precision.

Figure 28:
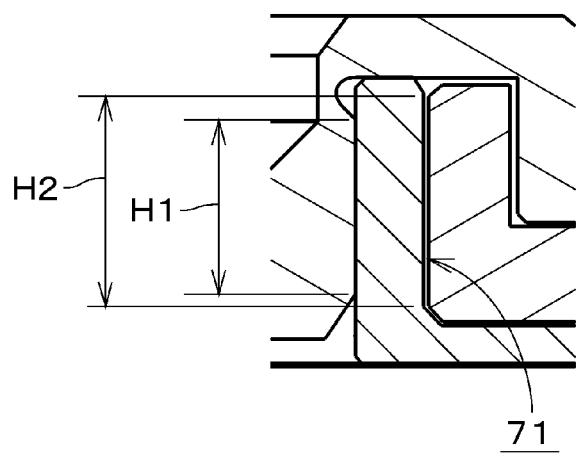
FIG. 28 is a cross-sectional view of a bearing mechanism according to another example of a preferred embodiment of the present invention.

The preferred embodiments of the present invention have been described above. However, the present invention is not limited to the above-described preferred embodiments and various changes can be made. In the above-described preferred embodiments, the existing range H2 of the radial gap 71 may preferably only overlap with at least a portion of the possible existing range H41 of the upper seal portion 74*a* and at least a portion of the lower seal portion 75*a* in the radial direction. In this way, it is possible to make the motor slimmer. In the first and second preferred embodiments, provided that the existing range H2 of the radial gap 71 radially overlaps with at least a portion in the axial direction of the fixing range H1 between the inner shaft portion 51 and the outer shaft portion 61, the existing range H2 of the radial gap 71 and the fixing range H1 may also be shifted from each other in the axial direction. Even in this case, it is possible to make the motor slimmer. As shown in FIG. 28, the existing range H2 of the radial gap 71 may also radially overlap with the entirety of the fixing range H1. In addition, also by radially overlapping the existing range H2 of the radial gap 71 and at least a portion of the existing range H3 of the stator fixing portion 212, it is possible to make the motor slimmer.

In the first preferred embodiment, by arranging the lower seal gap 75 upper than that in FIG. 3, the existing range of the lower seal portion 75*a* may preferably radially overlap with the entirety of the existing range of the upper seal portion 74*a*.

The outer shaft portion 61 and the inner shaft portion 51 may also be fixed to each other, for example, by press fitting and may also be fixed to each other by adhesion and press fitting. Further, the outer shaft portion 61 and the inner shaft portion 51 may also be fixed to each other by, for example, shrinkage fitting. In the third preferred embodiment, the shaft portion 65 and the upper plate portion 54 may also be defined by a single monolithic member. In this case, the shaft portion 65 and the lower plate portion 66 preferably become separate members.

In the first and second preferred embodiments described above, the upper thrust dynamic pressure generating groove array may also be formed on the lower surface 531 of the upper plate cylindrical portion 521 and may also be provided on both the lower surface 531 and the upper surface 422 of the sleeve flange portion 42. The lower thrust dynamic pressure generating groove array may also be provided on the upper surface 631 of the lower plate connecting portion 621 and may also be provided on both the upper surface 631 and the lower surface 423 of the sleeve flange portion 42. The same also applies to the third preferred embodiment.

In the first and second preferred embodiments, the radial dynamic pressure generating groove array may also be provided on the outer circumferential surface of the outer shaft portion 61, and may also be provided on both the outer circumferential surface of the outer shaft portion 61 and the inner circumferential surface of the inner sleeve cylindrical portion 41. Similarly, also in the third preferred embodiment, the radial dynamic pressure generating groove array may also be provided on the inner circumferential surface of the shaft portion 65. In the first preferred embodiment, the radial dynamic pressure bearing portions may also be provided in both the radial gap 71 and the vertical connection gap 762. The same also applies to the other preferred embodiments.

The upper thrust dynamic pressure generating groove array may also preferably be an aggregate of herringbone-shaped grooves. Similarly, the lower thrust dynamic pressure generating groove array may also preferably be an aggregate of herringbone-shaped grooves.

In the above-described preferred embodiments, the upper thrust dynamic pressure bearing portion 725 may not necessarily be provided. In a case where the upper thrust dynamic pressure bearing portion 725 is not provided, the magnetic center of the stator 22 is preferably arranged lower than the magnetic center of the rotor magnet 32 in the axial direction, whereby each of the bearing mechanisms 123 and 123*b* can stably support the rotating portion 122 in a thrust direction.

In the above-described preferred embodiments, the rotor hub 31 may also be formed through, for example, press working or a cutting work.

Each of the bearing mechanisms 123 and 123*b* may also be used in an inner rotor type motor in which a rotor magnet is arranged radially inner than a stator.

The base plate 21 and the lower plate portion 62 may also be provided by a single component. In a case where the base plate 21 and the lower plate portion 62 are a single component, it is possible to reduce a component cost or the number of assembling processes.

The configurations in the above-described preferred embodiments and each modified example may also be appropriately combined unless they are inconsistent with each other.

The present invention can be utilized as a motor of a disk drive apparatus and can also be utilized as a motor of an apparatus other than the disk drive apparatus.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
    a rotating portion including a rotor magnet; and
    a stationary portion including a stator facing the rotor magnet; wherein
    the stationary portion includes:
        a shaft component including an inner shaft portion arranged around a central axis and an outer shaft portion fixed to an outer circumferential surface of the inner shaft portion;
        an upper plate portion defining a single monolithic member together with one of the inner shaft portion and the outer shaft portion and extending radially outward from an upper portion of the one of the inner shaft portion and the outer shaft portion; and
        a lower plate portion defining a single monolithic member together with the other of the inner shaft portion and the outer shaft portion and extending radially outward from a lower portion of the other of the inner shaft portion and the outer shaft portion;
    the rotating portion includes a sleeve portion which is disposed between the upper plate portion and the lower plate portion;
    a lubricating oil is continuously present between an upper thrust gap between the sleeve portion and the upper plate portion, a radial gap between the sleeve portion and the outer shaft portion, and a lower thrust gap between the sleeve portion and the lower plate portion;
    an upper seal portion is arranged to extend radially outward from the radial gap and between the stationary portion and the rotating portion, an upper surface of the lubricating oil being located in the upper seal portion;
    a lower seal portion is arranged to extend radially outward from the radial gap between the stationary portion and the rotating portion, a lower surface of the lubricating oil being located in the lower seal portion;
    a lower thrust dynamic pressure generating groove array is arranged on at least one surface of a lower surface of the sleeve portion and an upper surface of the lower plate portion, the lower surface of the sleeve portion and the upper surface of the lower plate portion defining the lower thrust gap;
    a radial dynamic pressure generating groove array is arranged on at least one surface of an inner circumferential surface of the sleeve portion and an outer circumferential surface of the outer shaft portion, the inner circumferential surface of the sleeve portion and an outer circumferential surface of the outer shaft portion defining the radial gap;
    the radial dynamic pressure generating groove array includes an upper radial dynamic pressure generating groove array and a lower radial dynamic pressure generating groove array;
    the inner shaft portion is fixed to the outer shaft portion in an interference fit; and
    an axial range of a fixing region of the inner shaft portion and the outer shaft portion which is in the interference fit is included in a range between the upper radial dynamic pressure generating groove array and the lower radial dynamic pressure generating groove array.

2. The motor according to claim 1, wherein the interference fit is a press fitting or a shrinkage fitting.

3. The motor according to claim 1, wherein the inner shaft portion and the outer shaft portion are fixed to each other by an adhesive.

4. The motor according to claim 3, wherein the inner shaft portion and the outer shaft portion are fitted to each other.

5. The motor according to claim 3, wherein an adhesive retaining portion is located between an outer peripheral portion of the inner shaft portion and an inner peripheral portion of the outer shaft portion.

6. The motor according to claim 3, wherein one plate portion of the upper plate portion and the lower plate portion defines a single monolithic member together with the outer shaft portion; and
    an axial range of a fixed region of the inner shaft portion to the outer shaft portion which is in the interference fit is closer to the one plate portion than the radial dynamic pressure generating groove.

7. The motor according to claim 1, wherein at least a portion in an axial direction of a fixing range, in which the outer shaft portion and the inner shaft portion radially overlap, radially overlaps with an existing range in the axial direction of the radial gap.

8. The motor according to claim 7, wherein
    the sleeve portion includes:
        an inner sleeve cylindrical portion in which the outer shaft portion is inserted; and
        a sleeve flange portion which extends radially outward from the inner sleeve cylindrical portion;
    the upper plate portion includes:
        an upper plate cylindrical portion arranged outward from the inner sleeve cylindrical portion, facing an upper surface of the sleeve flange portion, and extending downward at an outer edge of the upper plate portion; and an upper plate connecting portion arranged to connect an upper portion of the shaft component and an upper portion of the upper plate cylindrical portion in a region above the inner sleeve cylindrical portion; and the upper seal portion is located between an outer circumferential surface of the upper plate cylindrical portion and the rotating portion.

9. The motor according to claim 8, wherein an upper thrust dynamic pressure bearing portion axially supporting the sleeve flange portion is located in an upper thrust gap between a lower surface of the upper plate cylindrical portion and the upper surface of the sleeve flange portion.

10. The motor according to claim 7, wherein the sleeve portion further includes an outer sleeve cylindrical portion extending upward from an outer edge portion of the sleeve flange portion; and an upper seal gap is defined between the outer circumferential surface of the upper plate cylindrical portion and an inner circumferential surface of the outer sleeve cylindrical portion, the upper seal gap having a radial width which gradually increases as it extends upward and the upper seal portion is located in the upper seal gap.

11. The motor according to claim 7, wherein an axial length of the fixing range is longer than an axial length of the radial gap, and the fixing range radially overlaps with an entirety of the radial gap.

12. The motor according to claim 7, wherein an axial length of the fixing range is longer than an axial length of the sleeve portion.

13. The motor according to claim 1, wherein the inner shaft portion includes a male screw with a flange.

14. The motor according to claim 1, wherein the sleeve portion includes a communicating hole penetrating through the sleeve portion in a vertical direction.

15. A disk drive apparatus comprising:
the motor according to claim 1, which rotates a disk;
an access portion that performs at least one of reading and writing of information from or to the disk; and
a housing accommodating the disk, the motor, and the access portion.

16. A motor comprising:
a rotating portion including a rotor magnet; and
a stationary portion including a stator facing the rotor magnet; wherein
the stationary portion includes:
a shaft component including an inner shaft portion arranged around a central axis, and an outer shaft portion fixed to an outer circumferential surface of the inner shaft portion;
an upper plate portion defining a single monolithic member together with one of the inner shaft portion and the outer shaft portion and extending radially outward from an upper portion of the one of the inner shaft portion and the outer shaft portion; and
a lower plate portion defining a single monolithic member with the other of the inner shaft portion and the outer shaft portion and extending radially outward from a lower portion of the other of the inner shaft portion and the outer shaft portion;
the rotating portion includes a sleeve portion disposed between the upper plate portion and the lower plate portion;

a lubricating oil is continuously provided between an upper thrust gap between the sleeve portion and the upper plate portion, a radial gap between the sleeve portion and the outer shaft portion, and a lower thrust gap between the sleeve portion and the lower plate portion;

an upper seal portion is arranged to extend radially outward from the radial gap and between the stationary portion and the rotating portion, an upper surface of the lubricating oil being located in the upper seal portion;

a lower seal portion is arranged to extend radially outward from the radial gap between the stationary portion and the rotating portion, a lower surface of the lubricating oil being located in the lower seal portion;

a lower thrust dynamic pressure generating groove array is arranged on at least one surface of a lower surface of the sleeve portion and an upper surface of the lower plate portion, the lower surface of the sleeve portion and the upper surface of the lower plate portion defining the lower thrust gap;

a radial dynamic pressure generating groove array is arranged on at least one surface of an inner circumferential surface of the sleeve portion and an outer circumferential surface of the outer shaft portion, the inner circumferential surface of the sleeve portion and the outer circumferential surface of the outer shaft portion defining the radial gap;

an adhesive retaining portion is provided between an outer peripheral portion of the inner shaft portion and an inner peripheral portion of the outer shaft portion;

the radial dynamic pressure generating groove array includes an upper radial dynamic pressure generating groove array and a lower radial dynamic pressure generating groove array; and an existing range in an axial direction of the adhesive retaining portion is included in a range between the upper radial dynamic pressure generating groove array and the lower radial dynamic pressure generating groove array.

17. The motor according to claim 16, wherein the inner shaft portion is fixed to the outer shaft portion in an interference fit;

one plate portion of the upper plate portion and the lower plate portion defines a single monolithic member together with the outer shaft portion; and an axial range of a fixing region of the inner shaft portion and the outer shaft portion which is in the interference fit is closer to the one plate portion than the radial dynamic pressure generating groove.

18. The motor according to claim 16, wherein at least a portion in the axial direction of a fixing range, in which the outer shaft portion and the inner shaft portion radially overlap, radially overlaps with an existing range in the axial direction of the radial gap.

19. The motor according to claim 16, wherein
the sleeve portion includes:
an inner sleeve cylindrical portion in which the outer shaft portion is inserted; and
a sleeve flange portion extending radially outward from the inner sleeve cylindrical portion;
the upper plate portion includes:
an upper plate cylindrical portion arranged outward from than the inner sleeve cylindrical portion, facing an upper surface of the sleeve flange portion, and extending downward at an outer edge of the upper plate portion; and
an upper plate connecting portion arranged to connect an upper portion of the shaft component and an upper portion of the upper plate cylindrical portion in a region above the inner sleeve cylindrical portion; and the upper seal portion is located between an outer circumferential surface of the upper plate cylindrical portion and the rotating portion.

20. The motor according to claim 19, wherein an upper thrust dynamic pressure bearing portion axially supporting the sleeve flange portion is located in an upper thrust gap between a lower surface of the upper plate cylindrical portion and the upper surface of the sleeve flange portion.

21. The motor according to claim 18, wherein the sleeve portion further includes an outer sleeve cylindrical portion extending upward from an outer edge portion of the sleeve flange portion; and an upper seal gap is defined between the outer circumferential surface of the upper plate cylindrical portion and an inner circumferential surface of the outer sleeve cylindrical portion, the upper seal gap having a radial width which gradually increases as it extends upward and the upper seal portion being located in the upper seal gap.

22. The motor according to claim 18, wherein an axial length of the fixing range is longer than an axial length of the radial gap, and the fixing range radially overlaps with an entirety of the radial gap.

23. The motor according to claim 18, wherein an axial length of the fixing range is longer than an axial length of the sleeve portion.

24. The motor according to claim 16, wherein the inner shaft portion includes a male screw with a flange.

25. The motor according to claim 16, wherein the sleeve portion includes a communicating hole penetrating through the sleeve portion in an up and down direction.

26. A disk drive apparatus comprising:
the motor according to claim 16, which rotates a disk;
an access portion that performs at least one of reading and writing of information from or to the disk; and
a housing accommodating the disk, the motor, and the access portion.

27. A motor comprising:
a rotating portion including a rotor magnet; and
a stationary portion including a stator facing the rotor magnet; wherein
the stationary portion includes:
a shaft component which includes an inner shaft portion arranged around a central axis, and an outer shaft portion fixed to an outer circumferential surface of the inner shaft portion;
an upper plate portion defining a single monolithic member together with the inner shaft portion and extending radially outward from an upper portion of the inner shaft portion; and
a lower plate portion defining a single monolithic member together with the outer shaft portion and extending radially outward from a lower portion of the outer shaft portion;
the rotating portion includes a sleeve portion disposed between the upper plate portion and the lower plate portion;
a lubricating oil is continuously present between an upper thrust gap between the sleeve portion and the upper plate portion, a radial gap between the sleeve portion and the outer shaft portion, and a lower thrust gap between the sleeve portion and the lower plate portion;
an upper seal portion is arranged to extend radially outward from the radial gap, and between the stationary portion and the rotating portion, an upper surface of the lubricating oil being located in the upper seal portion;
a lower seal portion is arranged to extend radially outward from the radial gap between the stationary portion and the rotating portion, a lower surface of the lubricating oil being located in the lower seal portion;
a lower thrust dynamic pressure generating groove array is arranged on at least one surface of a lower surface of the sleeve portion and the upper surface of the lower plate portion, the lower surface of the sleeve portion and the upper surface of the lower plate portion defining the lower thrust gap;
a radial dynamic pressure generating groove array is arranged on at least one surface of an inner circumferential surface of the sleeve portion and an outer circumferential surface of the outer shaft portion, the inner circumferential surface of the sleeve portion and the outer circumferential surface of the outer shaft portion defining the radial gap; and
an axial position of a lower end of the inner shaft portion and an axial position of a lower end of the upper plate cylindrical portion conform to each other, or the lower end of the inner shaft portion is arranged higher than the axial position of the lower end of the upper plate cylindrical portion.

28. The motor according to claim 27, wherein at least a portion in an axial direction of a fixing range, in which the outer shaft portion and the inner shaft portion radially overlap, radially overlaps with an existing range in the axial direction of the radial gap.

29. The motor according to claim 28, wherein
the sleeve portion includes:
an inner sleeve cylindrical portion in which the outer shaft portion is inserted; and
a sleeve flange portion extending radially outward from the inner sleeve cylindrical portion;
the upper plate portion includes:
an upper plate cylindrical portion arranged to extend outward from the inner sleeve cylindrical portion, facing the upper surface of the sleeve flange portion, and extending downward at an outer edge of the upper plate portion; and
an upper plate connecting portion arranged to connect an upper portion of the shaft component and an upper portion of the upper plate cylindrical portion in a region above the inner sleeve cylindrical portion; and
the upper seal portion is arranged between the outer circumferential surface of the upper plate cylindrical portion and the rotating portion.

30. The motor according to claim 28, wherein an upper thrust dynamic pressure bearing portion axially supporting the sleeve flange portion is located in an upper thrust gap between a lower surface of the upper plate cylindrical portion and an upper surface of the sleeve flange portion.

31. The motor according to claim 28, wherein the sleeve portion further includes an outer sleeve cylindrical portion facing upward from an outer edge portion of the sleeve flange portion; and an upper seal gap is defined between an outer circumferential surface of the upper plate cylindrical portion and an inner circumferential surface of the outer sleeve cylindrical portion, the upper seal gap having a radial width which gradually increases as it extends upward and the upper seal portion is located in the upper seal gap.

32. A disk drive apparatus comprising:
the motor according to claim 27, which rotates a disk;
an access portion that performs at least one of reading and writing of information from or to the disk; and
a housing accommodating the disk, the motor, and the access portion.

\* \* \* \* \*